US010933654B2

(12) United States Patent
Duan et al.

(10) Patent No.: US 10,933,654 B2
(45) Date of Patent: Mar. 2, 2021

(54) PROCESS FOR ISOTROPIC STRUCTURAL COLOUR PRINTING AND AN APPARATUS FOR DETECTING A TARGET SUBSTANCE IN THE GASEOUS PHASE

(71) Applicant: NANYANG TECHNOLOGICAL UNIVERSITY, Singapore (SG)

(72) Inventors: Hongwei Duan, Singapore (SG); Ling Bai, Singapore (SG)

(73) Assignee: NANYANG TECHNOLOGICAL UNIVERSITY, Singapore (SG)

( * ) Notice: Subject to any disclaimer, the term of this patent is extended or adjusted under 35 U.S.C. 154(b) by 0 days.

(21) Appl. No.: 16/472,657

(22) PCT Filed: Dec. 21, 2017

(86) PCT No.: PCT/SG2017/050631
§ 371 (c)(1),
(2) Date: Jun. 21, 2019

(87) PCT Pub. No.: WO2018/117965
PCT Pub. Date: Jun. 28, 2018

(65) Prior Publication Data
US 2019/0366733 A1 Dec. 5, 2019

(30) Foreign Application Priority Data
Dec. 21, 2016 (SG) .............................. 10201610730S

(51) Int. Cl.
*B41J 2/21* (2006.01)
*B05D 5/06* (2006.01)
(Continued)

(52) U.S. Cl.
CPC .............. *B41J 2/2107* (2013.01); *B05D 5/06* (2013.01); *B05D 5/061* (2013.01); *B05D 5/065* (2013.01);
(Continued)

(58) Field of Classification Search
CPC ......... B41J 2/2107; B41M 3/14; B05D 5/061; B05D 5/065; C09D 11/50; G01N 21/25; G01N 21/41
See application file for complete search history.

(56) References Cited

U.S. PATENT DOCUMENTS 9,347,923 B1   5/2016   Allendorf et al.
2003/0008771 A1*  1/2003   Fu ............................ C09C 1/30
502/159
(Continued)

OTHER PUBLICATIONS

Anderson et al., "Insights into phase transition kinetics from colloid science," *Nature* 416:811-815, 2002.
(Continued)

*Primary Examiner* — Matthew Luu
*Assistant Examiner* — Kendrick X Liu
(74) *Attorney, Agent, or Firm* — Seed IP Law Group LLP

(57) ABSTRACT

According to the present disclosure, an isotropic structural colour printing process is provided. The process comprising (a) providing an ink composition comprising ink particles (such as polymeric particles (e.g. polystyrene), metal-organic frameworks (MOFs) (e.g. ZIF-8)) in a liquid reagent; and (b) depositing the ink composition onto a surface of a substrate (e.g. anodic aluminium oxide membrane, photo papers). Due to capillary action and/or absorption of the liquid reagent, the ink particles form an amorphous arrangement of structures that lead to isotropic structural colour. In the preferred embodiment, the ink particles may further be coated with a catechol group (such as polydopamine). An apparatus for detecting a target substance in the gaseous phase, wherein the apparatus comprises a nanostructure capable of exhibiting a change in isotropic structural colour when one or more molecules of the target substance are entrapped as an indication that the target substance is present, is also provided.

20 Claims, 15 Drawing Sheets

(51) Int. Cl.
  C09D 11/50 (2014.01)
  G01N 21/25 (2006.01)
  G01N 21/41 (2006.01)
  B41M 3/14 (2006.01)
(52) U.S. Cl.
  CPC ............ *C09D 11/50* (2013.01); *G01N 21/25* (2013.01); *G01N 21/41* (2013.01); *B41M 3/14* (2013.01)

(56) References Cited

U.S. PATENT DOCUMENTS

| 2004/0130676 | A1* | 7/2004 | Doshi | B29D 11/00317 351/159.25 |
|---|---|---|---|---|
| 2012/0255452 | A1* | 10/2012 | Bower | C09D 11/30 101/216 |
| 2016/0170091 | A1* | 6/2016 | Li | C08F 2/22 424/401 |

OTHER PUBLICATIONS

Arsenault et al., "From colour fingerprinting to the control of photoluminescence in elastic photonic crystals," *Nature Materials* 5:179-184, 2006.
Arsenault et al., "Photonic-crystal full-colour displays," *Nature Photonics* 1:468-472, 2007.
Bai et al., "Bio-Inspired Vapor-Responsive Colloidal Photonic Crystal Patterns by Inkjet Printing," *ACS Nano* 8(11):11094-11100, 2014.
Betancur et al., "Transparent polymer solar cells employing a layered light-trapping architecture," *Nature Photonics* 7:995-1000, 2013.
Braun et al., "Epitaxial Growth of High Dielectric Contrast Three-Dimensional Photonic Crystals," *Adv. Mater.* 13(10):721-724, 2001.
Burgess et al., "Structural color in colourimetric sensors and indicators," *J. Mater. Chem. C.* 1:6075-6086, 2013.
Denesuk et al., "Capillary Penetration of Liquid Droplets into Porous Materials," *Journal of Colloid and Interface Science* 158:114-120, 1993.
Dumanli et al., "Recent advances in the biomimicry of structural colours," *Chem. Soc. Rev.* 45:6698-6724, 2016. (28 pages).
Fazio et al., "Coherent backscattering of Raman light," *Nature Photonics* 11:170-177, 2017.
Fenzl et al., "Photonic Crystals for Chemical Sensing and Biosensing," *Angew. Chem. Int. Ed.* 53: 3318-3335, 2014.
Fenzl et al., "Photonic Crystals for Chemical Sensing and Biosensing," Pre-Publication—*Angew. Chem. Int. Ed.* 53:2-21, 2014.
Forster et al., "Biomimetic Isotropic Nanostructures for Structural Coloration," *Adv. Mater.* 22:2939-2944, 2010.
Von Freymann et al., "Bottom-up assembly of photonic crystals," *Chem. Soc. Rev.* 42:2528-2554, 2013.
Von Freymann et al., "Enhanced Coupling to Slow Photon Modes in Three-Dimensional Graded Colloidal Photonic Crystals," *Adv. Mater.* 17:1273-1276, 2005.
Furumi, "Active lasing from organic colloidal photonic crystals," *J. Mater. Chem. C.* 1:6003-6012, 2013.
Garcia et al., "Photonic Glasses: A Step Beyond White Paint," *Adv. Mater.* 22:12-19, 2010.
Ge et al., "A Robust Smart Window: Reversibly Switching from High Transparency to Angle-Independent Structural Color Display," *Adv. Mater.* 27:2489-2495, 2015.
Ge et al., "Highly Tunable Superparamagnetic Colloidal Photonic Crystals," *Agnew. Chem. Int. Ed.* 46:7428-7431, 2007.
Ge et al., "Spray coating of superhydrophobic and angle-independent coloured films," *Chem. Commun.* 50:2469-2472, 2014.
Gu et al., "Fabrication of High-Quality Opal Films with Controllable Thickness," *Chem. Mater.* 14:760-765, 2002.
Gu et al., "Tailoring Colloidal Photonic Crystals with Wide Viewing Angles," *Small* 9(13):2266-2271, 2013.

Ho et al., "Existence of a Photonic Gap in Periodic Dielectric Structures," *Physical Review Letters* 65(25):3152-3155, 1990.
Holtz et al., "Polymerized colloidal crystal hydrogel films as intelligent chemical sensing materials," *Nature* 389:829-832, 1997.
Hu et al., "Analysis of the Effects of Marangoni Stresses on the Microflow in an Evaporating Sessile Droplet," *Langmuir* 21:3972-3980, 2005.
Hu et al., "Analysis of the Microfluid Flow in an Evaporating Sessile Droplet," *Langmuir* 21:3963-3971, 2005.
International Search Report and Written Opinion, for International Application No. PCT/SG2017/050631, dated Mar. 23, 2018, 13 pages.
Iwata et al., "Bio-Inspired Bright Structurally Colored Colloidal Amorphous Array Enhanced by Controlling Thickness and Black Background," *Adv. Mater.* 29:1605050, pp. 1-8, 2017.
Jiang et al., "Large-Scale Fabrication of Wafer-Size Colloidal Crystals, Macroporous Polymers and Nanocomposites by Spin-Coating," *J. Am. Chem. Soc.* 126:13778-13786, 2004.
Kang et al., "Broad-wavelength-range chemically tunable block-copolymer photonic gels," *Nature Materials* 6:957-960, 2007.
Kang et al., "Printable and Rewritable Full Block Copolymer Structural Color," *Adv. Mater.* 29:1700084, pp. 1-8, 2017.
Kawamura et al., "Full-Color Biomimetic Photonic Materials with Iridescent and Non-Iridescent Structural Colors," *Scientific Reports* 6:33984, pp. 1-10, 2016.
Kim et al., "Spatially and temporally reconfigurable assembly of colloidal crystals," *Nature Communications* 5(3676):1-8, 2014.
Kim et al., "Structural colour printing using a magnetically tunable and lithographically fixable photonic crystal," *Nature Photonics* 3:534-540, 2009.
Kinoshita et al., "Physics of structural colors," *Rep. Prog. Phys.* 71:1-30, 2008. (31 pages).
Kohri et al., "Biomimetic non-iridescent structural color materials from polydopamine black particles that mimic melanin granules," *J. Mater. Chem. C.* 3:720-724, 2015.
Kuang et al., "Inkjet Printing Patterned Photonic Crystal Domes for Wide Viewing-Angle Displays by Controlling the Sliding Three Phase Contact Line," *Adv. Optical Mater.* 2:34-38, 2014.
Lee et al., "Colour-barcoded magnetic microparticles for multiplexed bioassays," *Nature Materials* 9:745-749, 2010.
Liu et al., "Fabrication of patterned photonic crystals with brilliant structural colors on fabric substrates using ink jet printing technology," *Materials and Design* 114:10-17, 2017.
Liu et al., "Slow Photons for Photocatalysis and Photovoltaics," *Adv. Mater.* 29:1605349-1605349, 2017.
Noda et al., "Spontaneous-emission control by photonic crystals and nanocavities," *Nature Photonics* 1:449-458, 2007.
Noh et al., "How Noniridescent Colors Are Generated by Quasi-ordered Structure of Bird Feathers," *Adv. Mater.* 22:2871-2880, 2010.
Pack et al., "Colloidal Drop Deposition on Porous Substrates: Competition among Particle Motion, Evaporation, and Infiltration," *Langmuir* 31:7953-7961, 2015.
Park et al., "Full-Spectrum Photonic Pigments with Non-iridescent Structural Colors through Colloidal Assembly," *Angew. Chem. Int. Ed.* 53:2899-2903, 2014.
Phillips et al., "A colloidoscope of colloid-based porous materials and their uses," *Chem. Soc. Rev.* 45(2):281-322, 2016. (43 pages).
Prevo et al., "Controlled, Rapid Disposition of Structured Coatings from Micro- and Nanoparticles Suspensions," *Langmuir* 20:2099-2107, 2004.
Prum et al., "Coherent light scattering by blue feather barbs," *Nature* 396:28-29, 1998.
Segev et al., "Anderson localization of light," *Nature Photonics* 7:197-204, 2013.
Sperling et al., "Direct determination of the transition to localization of light in three dimensions," *Nature Photonics* 7:48-52, 2013.
Starov et al., "Spreading of Liquid Drops over Dry Porous Layers: Complete Wetting Case," *Journal of Colloid and Interface Science* 252:397-408, 2002.
Starov et al., "Spreading of Liquid Drops over Dry Porous Layers: Complete Wetting Case," *Langmuir* 18:9744-9750, 2002.

(56) References Cited

OTHER PUBLICATIONS

Sun et al., "Structural coloration in nature," *Rsc Advances* 3:14862-14889, 2013.

Takeoka et al., "Production of Colored Pigments with Amorphous Arrays of Black and White Colloidal Particles," *Angew. Chem. Int. Ed.* 52:7261-7265, 2013.

Takeoka et al., "Structural Colored Liquid Membrane without Angle Dependence," *ACS AMI* 1(5):982-986, 2009.

Takeoka, "Angle-independent structural coloured amorphous arrays," *J. Mater. Chem.* 22:23299-23309, 2012.

Velev et al., "A Class of Microstructured Particles Through Colloidal Crystallization," *Science* 287:2240-2243, 2000. (5 pages).

Velev et al., "Materials Fabricated by Micro- and Nanoparticle Assembly—The Challenging Path from Science to Engineering," *Adv. Mater.* 21:1897-1905, 2009.

Wang et al., "Patterned photonic crystals fabricated by inkjet printing," *J. Mater. Chem. C.* 1:6048-6058, 2013.

Wang et al., "When Brownian diffusion is not Gaussian," *Nature Materials* 11:481-485, 2012.

Washburn, "The Dynamics of Capillary Flow," *The Physical Review*, vol. XVII, No. 3, pp. 273-283, 1921.

Wiersma, "The physics and applications of random lasers," *Nature Physics* 4:359-367, 2008.

Yoshioka et al., "Production of Colourful Pigments Consisting of Amorphous Arrays of Silica Particles," *ChemPhysChem* 15:2209-2215, 2014.

Zhang et al., "Highly Efficient Perovskite Solar Cells with Tunable Structural Color," *Nano Lett.* 15:1698-1702, 2015.

Zhang et al., "Using Cuttlefish Ink as an Additive to Produce Non-iridescent Structural Colors of High Color Visibility," *Adv. Mater.* 27:4719-4724, 2015.

Zhao et al., "Large-scale ordering of nanoparticles using viscoelastic shear processing," *Nature Communications* 7(11661):1-10, 2016.

Zhao et al., "Spherical Colloidal Photonic Crystals,"*Acc. Chem. Res.* 47:3632-3642, 2014.

\* cited by examiner

US 10,933,654 B2

PROCESS FOR ISOTROPIC STRUCTURAL COLOUR PRINTING AND AN APPARATUS FOR DETECTING A TARGET SUBSTANCE IN THE GASEOUS PHASE

CROSS-REFERENCE TO RELATED APPLICATION

This application claims the benefit of priority of Singapore Patent Application No. 10201610730S, filed 21 Dec. 2016, the content of it being hereby incorporated by reference in its entirety for all purposes.

TECHNICAL FIELD

The present disclosure relates to an isotropic structural colour printing process. The present disclosure also relates to an apparatus relying on such isotropic structural colour for detecting a target substance in the gaseous phase.

BACKGROUND

Structural colours commonly found in nature, such as those on butterfly wings, beetle cuticles and peacock feathers, have attracted considerable attention in a variety of research areas because of, for example, their photo-stability and energy efficiency. In contrast to pigment colour, structural colour arises from interference, diffraction and/or scattering of light from microstructures or nanostructures with length scale on the order of the wavelength of light. The unique colours originating from the physical structures may be iridescent and metallic, and are not easily mimicked by chemical dyes or pigments. Furthermore, unlike traditional pigments or dyes, structural colour is free from photobleaching. This implies there are many applications for structural colours with such unique properties, for example, structural colour sensors, displays, lasers, solar cells, anti-counterfeiting applications.

Structural colour may be classified into two categories. The two categories are (1) angle-dependent colour imparted by long-range ordered periodic structures and (2) angle-independent colour resulting from short-range ordered, amorphous structures. The former is beautifully illustrated in butterfly wings, beetle scales and opals. The latter may be commonly found in birds, e.g. *Cotinga maynana* and *L. coronata*, the blue skin of mandrills, and scales of longhorn beetles.

Angle-independent structural colour is of considerable interest for applications that require broad viewing angles, including building skins, textiles, display boards, print media, cosmetics, colourimetric sensors and optical devices. Intense research efforts have been made to create angle-independent structural colour by packing ordered colloidal crystals (CCs) (i.e. microbeads and micro-cylinders) into an isotropic medium or preparing colloidal assemblies via spin coating, drop-casting, or spraying. These conventional approaches, however, may either be time consuming and costly, or not viable for mass production due to incompatibility with traditional printing technologies.

CCs, one of the most widely investigated photonic materials, are typically fabricated by evaporation. The spatially ordered structures of CCs give rise to a photonic band gap (PBG), which leads to vivid, metallic structural colours and also a variety of exciting fundamental effects (e.g. slow light effects and spontaneous emission control). However, the iridescent colour of CCs caused by angle-dependent Bragg diffraction becomes a major problem in developing structural colour based sensors or displays where wide viewing angles are necessary. As such, amorphous colloidal arrays (ACAs) with structural colours have attracted increasing attention. In contrast to CCs, the key to fabricating ACAs is to avoid colloidal crystallization. The fabrication may involve bidisperse suspensions, high viscosity media, soft particles, or flocculation for colloidal assembly.

Notwithstanding the above, a cost-effective manufacturing scheme that allows for large-scale printing of isotropic, angle-independent structural colours in high resolution is not readily available.

There is therefore a need to provide for a process that ameliorates and/or resolves one or more of the issues mentioned above. The process should provide for printing of isotropic structural colours onto a surface. Such isotropic structural colours can be used, for instance, in the development of an apparatus for detecting a target substance in the gaseous phase.

SUMMARY

In one aspect, there is provided for an isotropic structural colour printing process comprising:

a) providing an ink composition comprising ink particles in a liquid reagent;

b) depositing the ink composition onto a surface of a substrate, wherein the liquid reagent comprised in the ink composition is separated from the ink particles by being drawn into the substrate, while the ink particles are retained on the surface of the substrate to define nanostructures for the isotropic structural colour printing.

In another aspect, there is provided for an apparatus for detecting a target substance in the gaseous phase, the apparatus comprising a nanostructure capable of exhibiting isotropic structural colour formed of a metal-organic framework comprising one or more cavities configured to reversibly entrap one or more molecules of the target substance, and wherein the nanostructure exhibits a change in isotropic structural colour when the one or more molecules of the target substance are entrapped as indication that the target substance is present.

BRIEF DESCRIPTION OF THE DRAWINGS

The drawings are not necessarily to scale, emphasis instead generally being placed upon illustrating the principles of the invention. In the following description, various embodiments of the present disclosure are described with reference to the following drawings, in which:

FIG. 3a shows a SEM image of the top-side view of a colloidal array created on an AAO membrane with a contact angle of 15°. The white bar represents a scale bar of 1 µm.

FIG. 3b shows a SEM image of the top-side view of a colloidal array created on an AAO membrane with a contact angle of 60°. The white bar represents a scale bar of 1 µm.

FIG. 3c shows a SEM image of the top-side view of a colloidal array created on an AAO membrane with a contact angle of 95°. The white bar represents a scale bar of 1 µm.

FIG. 3d shows the 2D fast Fourier transform (FFT) patterns of the corresponding SEM image of colloidal arrays of FIG. 3a.

FIG. 3e shows the 2D FFT patterns of the corresponding SEM image of colloidal arrays of FIG. 3b.

FIG. 3f shows the 2D FFT patterns of the corresponding SEM image of colloidal arrays of FIG. 3c.

DETAILED DESCRIPTION

Figure 1:
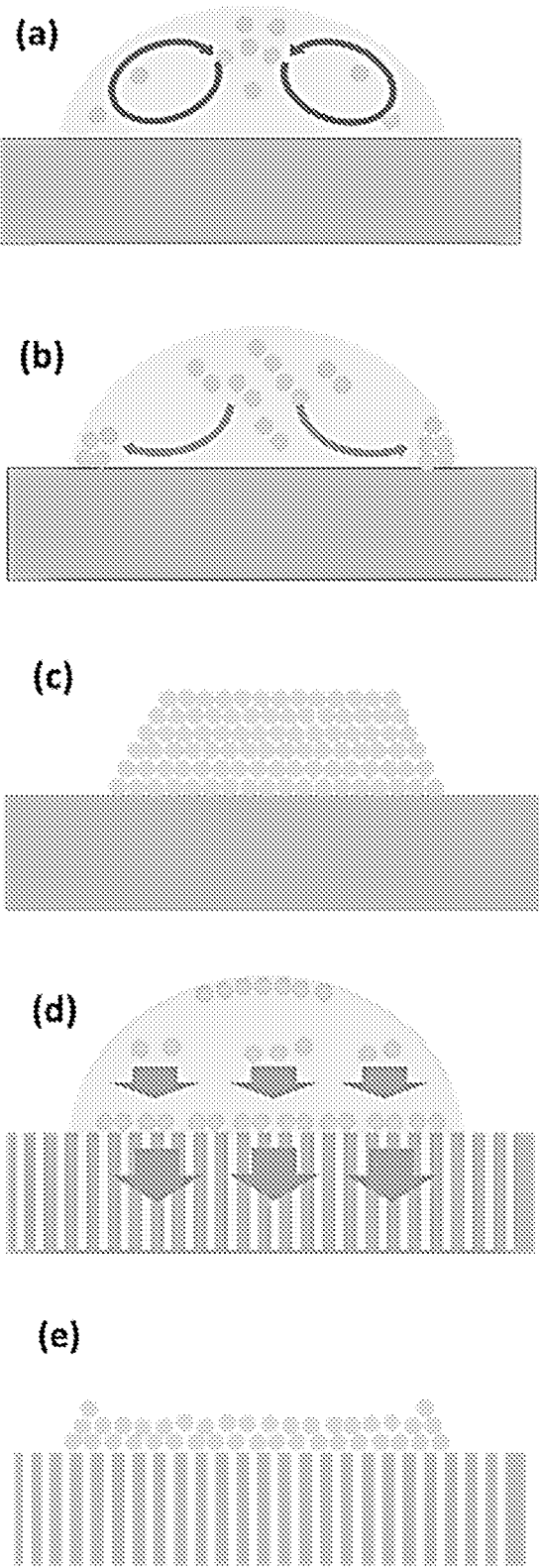
FIG. 1*a* shows a schematic diagram of Marangoni recirculation of the colloidal particles.
FIG. 1*b* shows a schematic diagram of outwards capillary flow existing within a colloidal ink droplet on a smooth substrate.
FIG. 1*c* shows photonic crystals formed by colloidal crystallization under co-influences of Marangoni recirculation and outwards capillary flow. It is difficult for colloidal particles (i.e. photonic crystals) to form disordered arrangements in this situation.
FIG. 1*d* illustrates that strong downwards capillary flow drives the particles downwards and fixes them to the substrate, thereby favouring the formation of amorphous colloidal arrays (ACAs).
FIG. 1*e* shows the ACA formed under the influence of downwards capillary flow.

The following detailed description refers to the accompanying drawings that show, by way of illustration, specific details and embodiments in which the invention may be practised.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

Generally, when an ink droplet comprising ink particles is deposited onto a surface, the ink particles within the droplet may self-assemble into an ordered array of structures to achieve a stable equilibrium state. As a result of these structures, different colours may be observed when the surface is viewed from different angles. For example, at one angle, the observed colour may be green, at another angle, the observed colour may be blue. The observed colours at different angles may also differ in terms of their tones (darkness or lightness), for example, green and light green. Such colours may be referred to as being angle-dependent in the present disclosure.

The ordered array of structures that give rise to the angle-dependent colours may result from colloidal crystallization of the particles caused by capillary force. During evaporation, Marangoni recirculation and outwards capillary flow exist within the ink droplet. The outwards capillary flow tends to bring the ink particles from the center to the edge of the droplet while Marangoni recirculation sets up a convection current that circulates the ink particles within the droplet, countering the outwards capillary flow. Under the influence of these two microflows within the droplet, the ink particles can self-assemble into ordered structures that are thermodynamically favourable, and result in colours that are angle-dependent.

By introducing a mechanism which suppresses the colloidal crystallization, the angle-dependency issue may be addressed.

For example, the substrate onto which the ink droplets are deposited is capable of imparting a force, such as capillary action, on the ink droplets. The substrate may, for example, draw the liquid reagent comprised in the ink composition into and/or through the substrate, while the ink particles are retained on the surface of the substrate. In doing so, the ink particles are trapped on the substrate, as the downwards infiltration flow exerts a downwards force on the particles, so that particles do not move away from the substrate and back towards the suspension. Since the particles in certain volume of liquid removed by infiltration are fixed immediately or almost immediately to the substrate, the concentration of particles in the suspension remains nearly constant and is too low for colloidal crystallization. Disordered packing of particles is then formed.

Structures having an amorphous arrangement of the ink particles may be formed as a result. Such a formation may be termed an amorphous colloidal array (ACA), defined herein as an arrangement where the colloidal ink particles are assembled into a state that exhibits no readily perceptible organization, regularity, or orientation of its constituent elements. Consequently, colours resulting from the amorphous arrangement of the structures are observably the same to a human naked eye when the surface with the printed ink particles is viewed from different angles (i.e. angle-independent colours).

The present approach is in contrast to methods involving removal of the liquid reagent from an ink composition by evaporation, since colloidal crystallization mechanisms, which may take place during evaporation to form the self-assembled ordered array of structures that give rise to angle-dependent colours, are not present. For the present approach, a very short amount of time, such as in the order of a few milliseconds or seconds, may be required to remove the liquid reagent by infiltration. As demonstrated herein, for example, about 1 millisecond to 4 milliseconds were required to remove the 300 pL of water droplets on AAO membranes by infiltration. In contrast thereto, a longer time, from several minutes to several hours may be required for evaporation, which may in turn depend on the temperature, humidity and the solvent used. The present mechanism for forming the isotropic nanostructures is also much simpler in execution as compared to methods such as accelerated heating, and is effective as compared to methods such as blow drying which does not result in isotropic nanostructures.

Such colours can then be used in the development of, for example, an apparatus for detecting a target substance in the gaseous phase. As will be discussed below, the detection is based on, for example, a change in isotropic structural colour when one or more molecules of the target substance are entrapped by the apparatus, as an indication that the target substance is present.

Details regarding various embodiments of the present approach and present apparatus are described as follows.

In the present disclosure, there is provided for an isotropic structural colour printing process comprising providing an ink composition comprising ink particles in a liquid reagent. The present process also includes depositing the ink composition onto a surface of a substrate, wherein the liquid reagent comprised in the ink composition is separated from the ink particles by being drawn into the substrate, while the ink particles are retained on the surface of the substrate to define nanostructures for the isotropic structural colour printing.

As used herein, the term "structural colours" is defined as colours which result from interaction of nanostructures with light, and includes both angle-dependent colours and angle-independent colours. Different colours may, for example, result from the same material due to differing light scattering behaviour depending on its structure such as size, shape, and/or aspect ratio.

The terms "angle-dependent colours", "non-isotropic colours" and "anisotropic structural colours" are used interchangeably herein to refer to structural colours that are not the same at different viewing angles. The term "angle-independent colours", "isotropic colours" and "isotropic structural colours", on the other hand, refer to structural colours that remain the same regardless of the angle which the structures is viewed from. Accordingly, the expression "isotropic structural colour printing" refers to the printing of ink particles that forms structures giving rise to isotropic structural colours.

The angle dependency may be determined from naked eye of a human. If the reflection peak position of the back-scattering spectra of a sample derived from the present printing process does not change when the incident angle changes, the colour is considered angle-independent. This means the tone of the colour does not changed while the brightness or saturation may vary.

In the present isotropic structural colour printing process, the step of providing an ink composition may comprise mixing the ink particles with a liquid reagent to form the ink composition.

The ink particles for forming the ink composition may be derived from any suitable materials, such as silica particles, ceramic particles, polymeric particles (e.g. poly(methyl methacrylate), phenolic resin, polystyrene (PS), carbon, melanin, polydopamine, polysulfide), metal-organic frameworks (MOFs) (e.g. ZIF-2, ZIF-8, ZIF-60, ZIF-62, ZIF-67, UiO-66, MOF-5, HKUST-1 etc.), inorganic particles of metals (Au, Ag, Cu, Al etc.), semiconductors (e.g. $TiO_2$, Si), metal oxides (e.g. $Al_2O_3$, $MnO_2$, $Fe_3O_4$), hybrid polymer particles containing functional inorganic particles, porous particles (e.g. mesoporous silica/carbon/metal/polymer/ MOFs) or fluorescent particles. The ink particles may be selected from the group consisting of carbon-based particles, ceramic particles, fluorescent particles, hybrid polymeric particles containing functional inorganic particles, metallic particles, metal-organic frameworks, metal oxide particles, polymeric particles, silica particles, semiconductor particles, and combinations thereof, according to various embodiments.

In this regard, the expression "ink particles" in the present disclosure is used interchangeably with terms such as "colloids", "colloidal ink", "colloidal ink particles", "crystals", "particles", "nanoparticles or sub-micrometer particles" (both referred to as NSPs in the present disclosure). The ink particles may also be in the form of photonic crystals. Where the particles are derived from MOFs, the particles may be simply referred to as MOFs.

The ink composition may be formed using a single type of ink particles or more than one type of ink particles, such as that mentioned above. Isotropic structural colour may still be obtained even when different types of ink particle are used, as the formation of isotropic structural colour is not affected by the use of multiple types of ink particle. The use of multiple types of ink particles may result in multicoloured patterns due to colour mixing from the ink particles. As for the use of a single type of ink particle, different isotropic structural colours may be obtained even when the same type is used. For instance, $SiO_2$ particles having different average sizes of 210 nm and 240 nm may be used to create blue and cyan coloured ink compositions, respectively. The size of the ink particles, when the same type is used, may be tuned to obtain different isotropic structural colours. In some instances of colour mixing, different sized particles of the same type are printed separately to first form the individual colours before mixing. The use of different sized particles may increase polydispersity but this does not result in anisotropic colours. Colours formed using a using single type of ink particles results in higher quality compared to colours formed using more than one type of ink particles.

In some embodiments, each of the ink particles may be coated with a polymer comprising a catechol group. Ink particles coated with such a polymer adhere better to the surface of the substrate. This prevents the ink particles from circulating within an ink composition that is deposited onto the substrate's surface due to Marangoni recirculation and outwards capillary flow. In such embodiments, the polymer comprising or including the catechol group may be selected from the group consisting of polydopamine, poly(norepinephrine), poly(L-3,4-dihydroxyphenylalanine), poly(5,6-dihydroxyl-1H-benzimidazole), polyphenol, dopamine-modified poly(L-glutamic acid), dopamine-modified polyphenol, dopamine-modified poly(ethyleneimine), copolymers thereof, and combinations thereof. In some embodiments, the polymer comprising the catechol group may comprise or consist of polydopamine.

In some embodiments, the present process may further comprise coating a layer of the polymer comprising the catechol group (e.g. polydopamine) to a thickness of 5 nm or more, or 15 nm or more, onto each of the ink particles before mixing with the liquid reagent. This may be carried out by mixing the starting reagents for forming the ink particles with a monomer (e.g. dopamine) of the polymer, or by forming the ink particles before mixing with the monomer (e.g. dopamine). For example, in embodiments where polystyrene is used to form the ink particles, polystyrene and dopamine may be mixed together and stirred overnight to form the polydopamine coated polystyrene (PS@PDA) ink particles. Coating each of the particles with a polymer comprising a catechol group (e.g. polydopamine) to a thickness of 15 nm or more provides for a higher success of coating the polymer onto the particles. In embodiments where polydopamine is used, it improves adhesion of the polydopamine coated particles to a substrate.

Additionally, when the particles are adhered to the substrate, they may be prevented from aggregating and crystallizing to form larger particles and/or arranging themselves into an ordered array, whereby such an ordered array results in non-isotropic structural colours.

The coating of a polymer comprising a catechol group has another advantage in that the polymer absorbs light scattered by the ACA as the polymer (e.g. polydopamine) tends to be dark or black in colour. This also helps to improve quality of the structural colour as the ACA tends to display a pale colour under natural light with increasing thickness due to multiple light scattering. The polymer absorbs the scattered light, thereby improving the quality.

It is mentioned herein that even in embodiments whereby the ink particles are not coated with the polymer comprising a catechol group, such ink particles may still be used to form nanostructures that give rise to isotropic structural colour, as formation of the isotropic structural colour may result from the removal and/or separation of the liquid reagent from the ink composition containing the ink particles by the underlying substrate. The liquid reagent may, for example, be removed and/or separated from the ink particles, such that the particles are not able to assemble into an ordered array of structures, thereby giving rise to isotropic structural colours.

The ink particles may be of any shape, and may have a plurality of sizes. Each of the ink particles may have a shape selected from the group consisting of spheres, cubes, octahedrons, rhombic dodecahedrons, rods, discs, truncated rhombic dodecahedrons, hexagonal prisms, and combinations thereof. The sizes may have a coefficient of variation of 30% or less. Based on this coefficient of variation, an ink composition with monodispersed ink particles may be formed. While monodispersed ink particles may be used, polydispersed ink particles help to enhance formation of an amorphous arrangement of the ink particles on a substrate's surface.

In various embodiments, providing the ink composition may comprise mixing the ink particles in the liquid reagent, wherein the ink particles comprise a plurality of sizes having a coefficient of variation of 30% or less. The size of a particle may refer to the longest distance measured from one end to another end of the particle. For example, when the particle is a perfect sphere, the size then refers to the diameter.

The liquid reagent may be mixed with the ink particles to form a suspension, such as a colloidal ink suspension. The liquid reagent may accordingly provide for printability of the ink composition on the substrate.

The liquid reagent may comprise or consist of a dispersion medium. The liquid reagent may also comprise a thickening agent for tuning the viscosity of the ink to facilitate printing. In some embodiments, the liquid reagent may comprise the dispersion medium and thickening agent. In some embodiments, the liquid reagent does not contain the thickening agent.

The dispersion medium is used to disperse the ink particles in the ink composition. Any suitable liquid may be used as the dispersion medium as long as the ink particles can be dispersed therein. Non-limiting examples of the dispersion medium include chloroform, dimethylformamide, ethyl acetate, glycerin, isopropyl alcohol, tetrahydrofuran and water. In various embodiments, the dispersion medium may be selected from chloroform, dimethylformamide, ethyl acetate, glycerin, isopropyl alcohol, tetrahydrofuran, water, and combinations thereof. Depending on the dispersion medium used, the liquid reagent may be an aqueous or an organic liquid.

Meanwhile, the thickening agent may be used to control viscosity of the ink composition. For example, it may be used to increase viscosity of the ink composition so as to control flowability, hence printability, of the ink composition. For example, a thickening agent may be included in a liquid reagent so as to moderate viscosity of the ink composition, such that the ink composition is able to maintain a specific printed pattern on a substrate. Different thickening agents and amounts of the thickening agent may be used depending on the type of dispersion medium used. In some embodiments, the thickening agent may comprise or consist of ethylene glycol, polyurethanes, acrylic polymers, latex, styrene, butadiene, polyvinyl alcohol, cellulosic derivatives and/or gelatin. Other thickening agents suitable for the purpose as described above may also be used. In some instances, a thinning agent may be used if the ink is too viscous. For example, the thinning agent may be a liquid or a mixture of liquids that is miscible but not reactive with the dispersion medium. In most instances, a thinning agent is not needed.

The thickening agent may be added after the ink particles are dispersed in the dispersion medium. For example, uncoated polystyrene particles and/or polystyrene ink particles coated with polydopamine may be mixed with water before ethylene glycol is added to form the ink composition.

Once the ink composition is prepared, the ink composition may be deposited, by any suitable means, onto a surface of a substrate. Such suitable means may include, without being limited to, spin coating, spray painting, brush painting, roll-to-roll printing and/or writing using a device (e.g. pen containing the ink composition). In the present process, no intervening layer or material may be required for depositing the ink composition onto the surface of the substrate. In other words, the ink composition may be directly deposited onto the surface of the substrate.

Any material may be used as the substrate as long as they are capable of drawing liquid reagent of an ink composition into the substrate such that it mitigates Marangoni recirculation, outwards capillary flow and/or colloidal crystallization that hinder derivation of isotropic structural colours. In other words, the substrate need not be a porous substrate as long as the substrate can absorb liquid into the substrate. In various embodiments, the step of depositing the ink composition is carried out on a substrate which is liquid-absorbent or liquid-permeable.

A liquid-absorbent substrate may be a substrate made from material(s) that can absorb liquid. Such liquid-absorbent substrate may include superabsorbent polymers such as sodium polyacrylate, polyacrylamide copolymer, cross-linked carboxymethyl cellulose, cross-linked carboxymethyl cellulose, polyvinyl alcohol copolymer, hydrogels or oil absorption polymers, etc. Non-limiting examples of polyacrylamide copolymers may include poly(acrylamide-co-acrylic acid) and poly(2-acrylamido-2-methyl-1-propane-sulphonic acid-co-acrylonitrile). A non-limiting example of a polyvinyl alcohol copolymer may be poly(vinyl alcohol-co-ethylene). A superabsorbent polymer refers to a polymer that absorbs and retains an extremely large amount of liquid relative to their own mass. In embodiments where a liquid-absorbent substrate is used, depositing the ink composition on such a substrate may comprise absorbing the liquid reagent into the porous substrate by ionic bond, covalent bond, hydrogen bond or van der Waals force. A liquid-permeable substrate, on the other hand, allows the liquid reagent to permeate through the substrate.

By using a liquid-absorbent substrate, the substrate is able to draw the liquid reagent comprised in the ink composition into the substrate. This in turn drives the ink particles towards and onto the substrate's surface, thereby mitigating the effects of colloidal crystallization within a deposited ink droplet, to form structures that give rise to isotropic structural colours. Both the liquid-absorbent substrate and the liquid-permeable substrate also mitigate colloidal crystallization that leads to non-isotropic structural colours.

With the above in mind, it is possible for a substrate formed from a non-absorbent material such as glass to be rendered liquid-absorbent or liquid-permeable by virtue of pores in the substrate that allow permeation of the liquid reagent therethrough. The substrate may accordingly be any suitable material, and may in embodiments be selected from the group consisting of a membrane, a glass, a paper, fibers, a plastic, a silica-based material, a fabric, a polymer, a hydrogel, and combinations thereof. In specific embodiments, the substrate is an absorbent photo paper.

In some embodiments, the substrate may be a porous substrate. The step of depositing the ink composition, according to some embodiments, may be carried out on a porous substrate comprising pores having a pore size which retains essentially all of the ink particles on the surface of the substrate. This implies that the pores should be sized to at least exclude all ink particles from passing through the substrate. The pore size at the surface of the substrate may be from 1 nm to any size that allows formation of an ACA on the substrate, and this includes pore sizes that may be the same as or larger than the average diameter of the ink particles. When the pore size at the surface of the substrate is same or larger than the average size of the ink particles, the deposition of ink particles into such pores causes pore blockage, thereby reducing the effective pore size and retaining the ink particles on the substrate. In some embodiments, the pore sizes may be in the range of 0.1 nm to 2 μm. In some embodiments, the ink particles may have an average size of 250 nm.

In some embodiments, the present process may further comprise modifying a surface of the substrate to become lipophilic, lipophobic, hydrophilic, hydrophobic, neutral, positively charged and/or negatively charged prior to depositing the ink composition, to enhance compatibility with the system for printing the ink particles. For example, silane coupling agents or click chemistry to introduce —OH, —COOH groups to make the substrate hydrophilic may be carried out. In other instances, molecules containing hydrophobic and lipophobic groups such as —$C_8H_{17}$, —$C_{16}H_{33}$, etc. may be used to modify the substrate. In other instances, both modification strategy may be carried out to make the substrate hydrophobic and lipophobic.

Different areas of the same substrate may be modified differently to allow adhesion of different ink particles to the substrate, which may translate in different isotropic structure colours on the different areas of the substrate.

By the term "essentially all", this means that at least 50%, such as at least 90%, at least 92%, at least 95%, or at least 98% of the ink particles are retained on the surface of the substrate.

According to the present process, the step of depositing the ink composition may comprise absorbing the liquid reagent into the porous substrate by capillary action. In other words, the pores of the substrate may be sized such that they draw liquid into the substrate, or at least sized to provide for capillary action on the liquid reagent, while retaining the ink particles on the surface of the substrate. The pores on the substrate's surface may be connected to tortuous channels within the substrate. The tortuous channels should be sized at least to provide for capillary action to draw liquid further into the substrate.

When the ink particles are deposited onto the surface of the substrate as a result of capillary action and/or absorption of the liquid reagent, the ink particles may form an amorphous arrangement of structures that lead to isotropic structural colour. These amorphous structures may be uniform microstructures or nanostructures, which may be collectively referred to as nanostructures in the present disclosure. In various embodiments of the present process, the nanostructures may be arranged as an amorphous layer of isotropic structures, which gives rise to isotropic structural colours.

The present process may further comprise drying the ink particles on the surface of the substrate. Drying of the ink particles may be carried out at any humidity. Pressure at which the drying is carried out is also not particularly limited, and may range from 0 to several million KPa, which may in turn depend on the materials used for the substrate. Temperature at which the drying is carried out, however, should be lower than boiling point and higher than freezing point of the ink composition. The complete removal or separation of the liquid reagent may range from 0.1 milliseconds to several seconds or minutes.

The present disclosure also provides for an apparatus for detecting a target substance in the gaseous phase, the apparatus comprising a nanostructure capable of exhibiting isotropic structural colour formed of a metal-organic framework comprising one or more cavities configured to reversibly entrap one or more molecules of the target substance, and wherein the nanostructure exhibits a change in isotropic structural colour when the one or more molecules of the target substance are entrapped as indication that the target substance is present.

Various embodiments of the present process and advantages associated with various embodiments of the present process, as described above, may be applicable to the present apparatus, and vice versa.

The present apparatus is used in the identification and/or detection of target substance. For this purpose, the target substance to be identified and/or detected may be in the gaseous phase, such as in its vapour form. For example, to identify or detect water in a sample, the sample may first be converted to its vapour state prior to analysis in the apparatus. In various embodiments, the target substance to be detected is a vapour comprising nitrogen, water vapour, toluene, ethanol, hexane and/or dimethylformamide. The identification and/or detection of the target substance is based on a change in isotropic structural colour, which is in turn a result of a change in the optical properties of the nanostructure comprised in the present apparatus.

In the present apparatus, the nanostructure is capable of exhibiting isotropic structural colour. The nanostructure, composed of metal-organic framework ink particles, is derivable from the present process described herein, though not limited to the nanostructure derived from the process described herein. The isotropic structural colour of metal-organic framework nanostructures results from light interaction with the metal-organic frameworks, which are arranged in an ordered manner to form the nanostructure.

When the gas molecule(s) of a target substance are entrapped in the one or more cavities of metal-organic frameworks, this leads to a change in the effective refractive index or periodic lattice parameters of the metal-organic frameworks. This results in a change in the colour exhibited by the metal-organic frameworks. In various embodiments, refractive index of the metal-organic frameworks may be increased. The gas molecules may form weak chemical or physical interaction with the chemical groups in the pores (i.e. cavities) of the metal-organic frameworks, such that depending on whether the weak chemical or physical interaction are formed or destroyed, the gas molecules are able to move within the cavities. Diffusion speed of these gas molecules may be different, depending on the gas molecules' physicochemical properties, their sizes, shapes, concentration, and their affinity with the adsorption sites at such cavities.

Metal-organic frameworks particles are typically compounds composed of metal ions or clusters coordinated to organic ligands to form one-, two-, or three-dimensional structures. These structures have one or more cavities, thereby rendering the metal-organic frameworks porous. In various embodiments, the metal-organic framework may be selected from the group consisting of ZIF based metal-organic framework, MIL based metal-organic framework, MOF based metal-organic framework, UIO based metal-organic framework, HKUST based metal-organic framework, and combinations thereof. In various embodiments, the metal-organic framework may be selected from the group consisting of ZIF-2, ZIF-8, ZIF-60, ZIF-62, ZIF-67, UiO-66, MOF-5, HKUST-1, and combinations thereof.

In various embodiments, the metal-organic framework particles may comprise or consist of a plurality of sizes having a coefficient of variation of 30% or less. While such particles may be used, polydispersed particles aid in the formation of ACAs. With such sizes, based on the present method, amorphous arrangement of the metal-organic frameworks particles are formed.

The apparatus may further comprise a substrate where the nanostructure may be arranged onto the substrate as an amorphous layer of isotropic structures. The substrate may be liquid-absorbent or liquid-permeable according to various embodiments. The functions of such substrate have been described above. The substrate may be lipophilic, lipophobic, hydrophilic, hydrophobic, neutral, positively charged and/or negatively charged. The substrate, as described above, may be selected from the group consisting of a membrane, a glass, a paper, fibers, a plastic, a silica-based material, a fabric, a polymer, a hydrogel, and combinations thereof.

The word "substantially" does not exclude "completely" e.g. a composition which is "substantially free" from Y may be completely free from Y. Where necessary, the word "substantially" may be omitted from the definition of the invention.

In the context of various embodiments, the articles "a", "an" and "the" as used with regard to a feature or element include a reference to one or more of the features or elements.

In the context of various embodiments, the term "about" or "approximately" as applied to a numeric value encompasses the exact value and a reasonable variance.

As used herein, the term "and/or" includes any and all combinations of one or more of the associated listed items.

As used herein, the phrase of the form of "at least one of A and B" may include A or B or both A and B. Correspondingly, the phrase of the form of "at least one of A and B and C", or including further listed items, may include any and all combinations of one or more of the associated listed items.

Unless specified otherwise, the terms "comprising" and "comprise", and grammatical variants thereof, are intended to represent "open" or "inclusive" language such that they include recited elements but also permit inclusion of additional, unrecited elements.

While the methods described above are illustrated and described as a series of steps or events, it will be appreciated that any ordering of such steps or events are not to be interpreted in a limiting sense. For example, some steps may occur in different orders and/or concurrently with other steps or events apart from those illustrated and/or described herein. In addition, not all illustrated steps may be required to implement one or more aspects or embodiments described herein. Also, one or more of the steps depicted herein may be carried out in one or more separate acts and/or phases.

EXAMPLES

The present disclosure relates to an approach for isotropic structural colour printing. The present approach should at least resolve the issue of conventional printing methods that are unable to accommodate and/or not suitable for rapid and large-scale fabrication of full-spectrum isotropic structural colour patterns with wide viewing angles. The present process is versatile in that any particles may be used as long as isotropic structural colours can be derived.

The present approach, as described below by way of examples, demonstrate an infiltration-assisted (IFAST) non-equilibrium assembly of colloidal particles on liquid-permeable and particle-excluding substrates. The term "non-equilibrium assembly" implies that the colloidal particles do not form ordered structures but assembles into structures in an unorganized manner. The latter leads to colloidal particles forming amorphous colloidal arrays (ACAs) within milliseconds. The IFAST assembly provides new possibilities for rapid manufacturing of non-iridescent isotropic structural colours and straightforward isotropic structural colour mixing. Full-spectrum non-iridescent isotropic structural colours are successfully produced by mixing primary isotropic structural colours of red, blue, and yellow using a commercial office inkjet printer. Rapid fabrication of large scale isotropic structural colour patterns with sophisticated colour combination/layout by IFAST printing is also realized. The IFAST technology is versatile for developing isotropic structural colour patterns with wide viewing angles, as colloidal particles, inks and substrates are flexibly designable for diverse applications. The present approach is further described in the examples below.

Example 1a: Materials

A variety of nanoparticles or sub-micrometer particles (both referred to as NSPs in the present disclosure) can be used in colloidal inks for isotropic structural colour printing. The NSPs may be polydispersed or monodispersed. Many kinds of monodispersed NPs can be used in colloidal inks for isotropic structural colour printing. The NSPs may include, without being limited to, silica NSPs, ceramic NSPs, polymeric NSPs (e.g. poly(methyl methacrylate), phenolic resin, PS, carbon, melanin, PDA, polysulfide), metal-organic frameworks (MOFs) (e.g. ZIF-2, ZIF-8, ZIF-60, ZIF-62, ZIF-67, UiO-66, MOF-5, HKUST-1 etc.), inorganic NSPs of metals (Au, Ag, Cu, Al etc.), semiconductors (e.g. $TiO_2$, Si), metal oxides (e.g. $Al_2O_3$, $MnO_2$, $Fe_3O_4$), hybrid polymer NSPs containing functional inorganic NSPs, porous NSPs (e.g. mesoporous silica/carbon/metal/polymer/MOFs) or fluorescent NSPs.

The shape of the particle is not limited to a sphere. Shapes like cubes, octahedrons, rhombic dodecahedrons, rods, discs, truncated rhombic dodecahedrons, hexagonal prisms, and combinations thereof, can also be used for isotropic structural colour printing.

In addition, any particle with any certain shape, including those mentioned above, is suitable for coating with polydopamine (PDA) to form hybrid polymer NSPs for isotropic structural colour printing.

The size uniformity of the particles does not limit its application for structural colour printing. However, uniformly sized particles may improve the quality of isotropic structural colour printing. Particles having a coefficient of variation of their sizes between 0% to 30% are potentially useful.

In one example, PS@PDA were synthesized by coating PDA on the surface of PS NSPs. The surface properties of such PS@PDA nanoparticles and their derivatives could be modified by using different ligands or polymers. The surface properties of NSPs of the present disclosure could be flexibly changed to being positively charged, negatively charged, neutral, hydrophilic, hydrophobic, lipophilic and/or lipophobic. The NSPs may be modified to become dispersable in different (e.g. aqueous or organic) liquids for formulating the colloidal ink.

The structural colour can be tailored by the size and refractive index of the NSPs, the thickness of the PDA coating, and the arrangement of NSPs in the ACAs or photonic crystals (PCs).

Another factor for isotropic structural colour printing is the liquid-permeable or liquid-absorbent substrate. The substrate should have a strong liquid absorption ability and should not have pores larger than the size of colloidal ink particles used in the ink composition. Any substrates comprising glass, silicon, paper, fibers, plastics, silk etc. could be used for structural colour printing as long as they meet these two requirements.

Regarding the substrates, its liquid (e.g. a solvent or a liquid reagent) absorption ability can be attributed to capillary forces in substrates arising from the pores of the substrates and the tortuous channels of the pores. Such pores may include micropores, mesopores, macropores etc. A macropore, in the context of the present disclosure, may be defined as a pore with diameter larger than 50 nm. A mesopore may be defined as a pore with diameter between 2 nm and 50 nm. A micropore may be defined as a pore with diameter less than 2 nm. Non-limiting examples of such porous substrate may include mesoporous silica/carbon/metal oxide/Si films, AAO films, colloidal particles arrays, fiber membranes, MOFs films, photo-papers, permeable papers filter papers (e.g. extraction thimbles, glass fiber/quartz fiber/oil/PTFE filters). The liquid absorption ability can also be caused by formation of hydrogen bonds and/or other chemical bonds between the liquid and the substrate. For instance, films having superabsorbent polymers (e.g. sodium polyacrylate, polyacrylamide copolymer, crosslinked carboxymethyl cellulose, polyvinyl alcohol copolymer) may be used to provide the liquid absorption ability. Hydrophobicity (or hydrophilicity) of the substrate surface allows organic liquids (or aqueous liquids) of the colloidal ink to permeate the substrate. Different ink-substrate systems may be designed for isotropic structural colour printing. For example, for oil based inks, hydrophobic substrates that are permeable to oil could be designed.

The self-assembly process of NSPs during printing can be controlled by the ink contact angle and absorption capability of the substrate. In this way, the final arrangements of NSPs may be varied to form long-range ordered photonic crystals and/or short-range ordered ACAs. This means that the colloidal lattice (arrangement of the NSPs) is present for the entire colloidal crystal and the expression "short-range" or "short-range order" would mean an arrangement of NSPs that is amorphous, which means a loss of spatial and translational periodicity of the colloidal array.

Example 1b: Capture of Water Droplets Infiltration on Anodic Aluminum Oxide (AAO) Membranes An inkjet printer head (MD-K-130, Microdrop, Germany) with an orifice diameter of 70 µm was used for generation of water droplets, controlled by a waveform generator (MD-E-201H, Microdrop, Germany). A high-speed camera (Fast-Cam SA5 monochrome, Photron) was used to obtain images at 20,000 fps with a resolution of 704×520 pixels, under direct illumination by an ultra-high pressure mercury lamp (Intensilight 130W, Nikon). An X-Y stage (06DTS-1M, Unice) was used to accurately move the AAO membranes to the desired place.

Example 1c: Preparation of Latex Ink Composition Based on Polystyrene Particles

In a non-limiting example, polystyrene (PS) and $SiO_2$ particles were obtained from Nanjing Nanorainbow Biotechnology Co., LTD. For synthesis of PS@PDA, 200 mg of PS particles and 100 mg dopamine were mixed with 200 ml Tris buffer (10 mM, pH 8.5) under stirring overnight. The obtained PS@PDA particles were purified three times and re-dispersed in water for further usage. In an example, printing inks were prepared by mixing 0.5 ml ethylene glycol with a latex suspension (2 ml) containing 7 wt % PS, $SiO_2$ or PS@PDA particles. All latex suspensions were placed in an ultrasonic bath for 10 minutes and filtered through micro-pore filters with a pore size of 0.5 μm before use.

Example 1d: IFAST Printing of Isotropic Structural Colour Patterns

Mono-colour ACA patterns were obtained by IFAST printing on photo papers using a Jetlab® 4 tabletop printing platform. Multicoloured patterns were obtained using an M-10 Epson inkjet printer. In one example, colloidal inks of $SiO_2$, PS or PS@PDA particles were filled into cyan-yellow-magenta cartridges for printing. $SiO_2$ particles with an average particle size of 210 nm and 240 nm were used to create blue and cyan colours. PS particles with a diameter of 240 nm were used for printing yellow colours and PS@PDA-1 (i.e. initial amount of dopamine used is 100 mg) with a size of 270 nm was used for printing red colours.

Example 1e: Characterization

Optical graphs were captured by a digital camera (EOS 700D, Canon). Micrographs were acquired by a CCD camera (CoolSnap, Photometrics), which was directly aligned to the inverted microscope (IX71, Olympus). Scanning electron microscopy (SEM) observations of arrangement of particles were conducted on a field emission scanning electron microscope (JSM-6700F, Japan). Transmission electron microscopy (TEM) images of particles were acquired on a Jeol JEM2010 electron microscope at an acceleration voltage of 300 kV. The 2D Fourier power spectra of the SEM images were obtained using Matlab. Reflective, back-scattering and scattering spectra were recorded using a fiber optic ultraviolet-visible (UV-vis) spectrometer (Ocean Optic HR2000CG). Contact angles were measured using a FTA200 contact angle analyzer.

Example 2a: IFAST with AAO Membranes

In this example, the present approach provides for rapid fabrication of non-iridescent isotropic structural colours by non-equilibrium assembly of ACAs on permeable substrates driven by liquid infiltration. Theoretical analysis and experiments were first performed on a well-defined substrate, i.e. anodic aluminum oxide (AAO) membrane. The rapid infiltration in AAO membrane causes a downward microflow in the colloidal dispersion, which transports the particles down and subsequently fixes them onto the substrate. As colloidal crystallization is greatly suppressed in this non-equilibrium state, ACAs are finally formed within milliseconds. In contrast, if there is no infiltration with respect to the substrates, the structures formed can be tailored from ACAs to CCs, when more liquid is left for evaporation. Colloidal assembly on flexible photo papers was subsequently investigated. In the presence of downwards infiltration flow, ACAs with vivid non-iridescent colours were successfully prepared. A full-spectrum structural colour International Commission on Illumination (CIE) chromaticity diagram was achieved by combination of red, blue, and yellow primary structural colours in real time. Large-scale landscape paintings with sophisticated combination and arrangement of colours were also demonstrated using a home printer at a speed higher than 10 $cm^2$/s. With readily tailored colloidal particles, inks and substrates, the present IFAST isotropic structural colour printing approach is a versatile technology for large-scale manufacture of isotropic structural colour patterns, which is of great importance for the development of flexible sensors/solar cells and full-colour paperlike displays.

Figure 2:
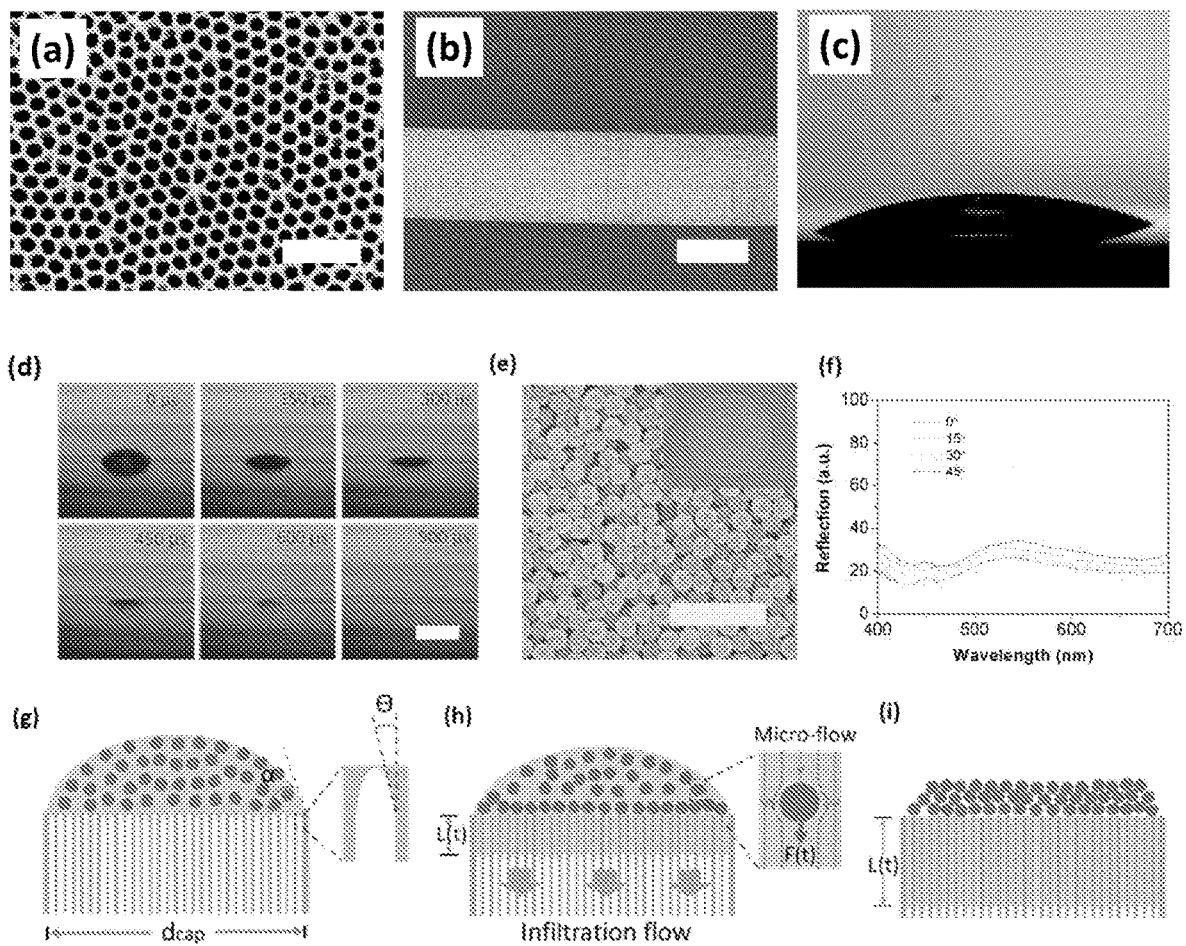
FIG. 2a shows a scanning electron microscopy (SEM) image of the top-side of an anodic aluminum oxide (AAO) membrane. The white bar represents a scale bar of 5 µm.
FIG. 2b shows a SEM image of the cross-side of the AAO membrane. The white bar represents a scale bar of 50 µm. The average thickness of the AAO membrane is 65 µm.
FIG. 2c shows the contact angle of 5 µl water droplet on the AAO membrane before modification (e.g. surface treatment to become hydrophilic).
FIG. 2d shows a series of images captured by a high speed camera for the entire removal process of a water droplet on an AAO membrane. The white bar represents a scale bar of 100 µm.
FIG. 2e shows a SEM image of a colloidal array prepared on an AAO membrane. The white bar represents a scale bar of 1 µm. The inset picture shows the microscope image of printed single microdots with an integration time of 100 ms.
FIG. 2f shows the reflection spectrum of ACAs at increasing incidence angles.
FIG. 2g is used to illustrate the formation of ACAs due to a strong downward infiltration flow.
FIG. 2h is used to illustrate the formation of ACAs due to a strong downward infiltration flow.
FIG. 2i is used to illustrate the formation of ACAs due to a strong downward infiltration flow.
Figure 3:
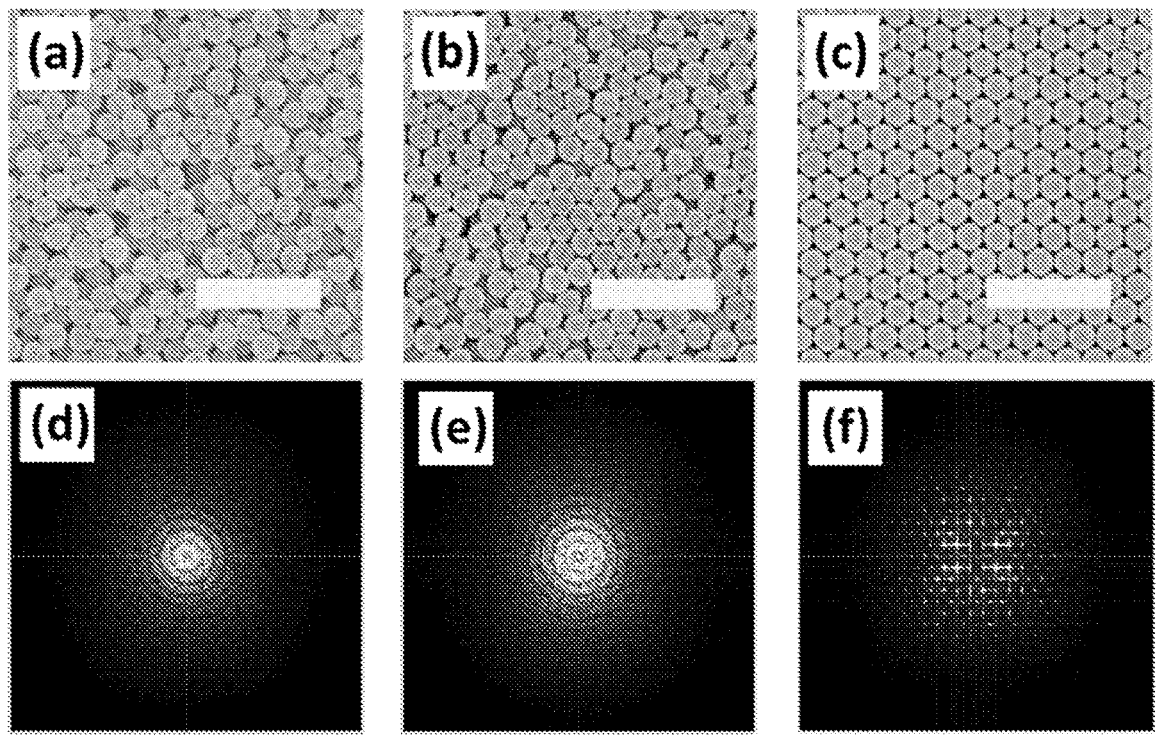
Figure 4:
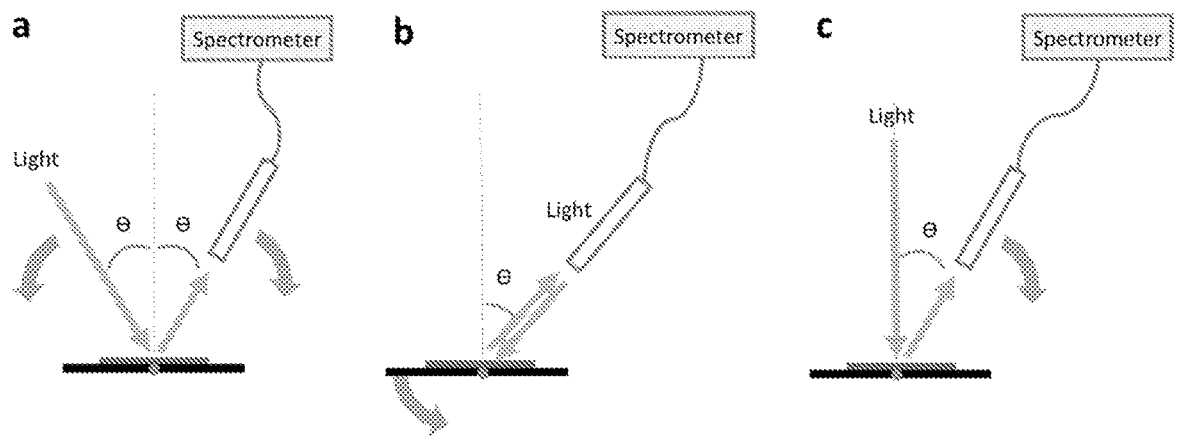
FIG. 4a shows a schematic diagram of an optical setup for measurements of specular reflection spectra.
FIG. 4b shows a schematic diagram of an optical setup for measurements of backward scattering spectra.
FIG. 4c shows a schematic diagram of an optical setup for measurements of diffusive scattering spectra.

Specifically, AAO membranes with uniform, size-controlled cylindrical pores penetrating the entire membrane are ideal substrates for quantitative analysis of liquid infiltration. Water droplets of 300 pL in volume were printed onto an AAO membrane with 90 nm pores (see FIG. 2a to FIG. 2c). The entire shape of a droplet falling onto an AAO substrate (see FIG. 2d) was captured over a series of images by a high speed camera. The droplet volume quickly decreased and vanished within 0.9 ms, caused by strong downward infiltration. Colloidal assembly on an AAO membrane was subsequently investigated. PS colloidal droplets (230 nm) of the same volume were printed on the same AAO membrane. The colloidal droplets were dried immediately, leaving self-assembled PS particles in an amorphous arrangement, as shown in FIG. 2e. The degree of order of the colloidal arrays was examined by two-dimensional fast Fourier transform (2D-FFT) analysis. FIG. 3d shows a 2D-FFT pattern with bright concentric circles, indicating the existence of spatial correlation lengths between particles that is found in a short-range ordered colloidal array. Specular reflection spectra of the colloidal arrays were also measured at incidence angles between 0° to 45° (see FIG. 4a). As shown in FIG. 2f, the reflection peaks hardly move with increasing incidence angles, indicating a high degree of disorder.

FIG. 2g presents the model, which was used for analyzing the infiltration driven colloidal assembly on the AAO membrane, based on the following assumptions: (1) The contact line of the droplet was pinned during the whole liquid reagent removal process, (2) pores of the AAO membrane were smaller than the size of PS particles, and liquid (e.g. liquid reagent) infiltration was governed by the Washburn equation, (3) vertical speed of infiltration flow in the cylindrical pores and the vertical speed of microflows at the bottom of droplet were independent of the radial distance to the drop center, and (4) contact angles of the AAO membrane and its pores were independent of each other.

For an AAO membrane with a contact angle in its pores smaller than 90°, the instantaneous infiltration length, L(t), in the AAO membrane at time t is given by:

$$L(t) = \sqrt{\frac{\sigma d_{pore} t \cos\theta}{4\mu}} = kt^{\frac{1}{2}}$$

where θ is the intrinsic contact angle of the pore, $d_{pore}$ is the average pore size of the AAO membrane, μ and σ are the dynamic viscosity and the surface tension, respectively of the liquid (water in this instance), and k is the capillary coefficient. The instantaneous speed of the downward flow $V_D(t)$ in the droplet caused by infiltration is given by:

$$V_D(t) = \varepsilon \frac{dL(t)}{dt} = \frac{\varepsilon k t^{-\frac{1}{2}}}{2}$$

where ε is the pore volume fraction of the AAO membrane. For a colloid particle with radius r that is held at a constant position, it experiences a downward Stokes drag exerted by the downward flow:

$$F(t) = 6\pi\mu r V_D(t)$$

This downward flow transports the colloidal particles towards the surface of the porous substrates. The Péclet number Pe here is set by the downward Stokes drag force to thermal forces:

$$Pe = F(t) r / (k_b T)$$

where $k_b$ is the Boltzmann constant and T is the temperature. For a spherical-capped droplet with volume $V_{cap}$, a drop deposition diameter $d_{cap}$, and an instantaneous contact angle α of the drop on the AAO membrane, the time for the AAO membrane to fully absorb the droplet equals:

$$t = \frac{\mu d_{cap}^2 \tan^2\frac{\alpha}{2}}{4\varepsilon^2 \sigma d_{pore} \cos\theta}$$

For an AAO membrane with thickness of 65 $d_{pore}$=90 nm, ε=42.9%, α=70°, if θ varies from 10° to 85°, it takes 0.35 ms to 4 ms to fully remove a 300 pL water droplet by infiltration, and the corresponding Péclet numbers at the end of infiltration vary from 804 to 21. This revealed that the Stokes drag force was too strong for diffusion to restore the equilibrium of colloidal particles in the suspension. The influence of Brownian motion caused by thermal energy was negligible compared to the downward microflow, which transported the particles to the substrate and traps them there. Since the particles in certain volume of liquid removed by infiltration were fixed immediately on the substrate, the concentration of particles in the suspension remained nearly constant during colloidal assembly. As the driven force for colloidal crystallization was missing in this non-equilibrium state, a disordered packing of particles was formed.

Example 2b: Surface Treatment of AAO Membranes

A plasma cleaner (PDC-002, Haprick, USA) was used to make substrates (AAO membranes, photo-papers and Si wafers) hydrophilic. The substrates were then placed in a 60 mm culture dish with 0.2 ml EtOH solution containing 5 wt % triethoxypropyl silane before heating at 45° C. to 60° C. overnight to obtain different wettability.

Figure 6:
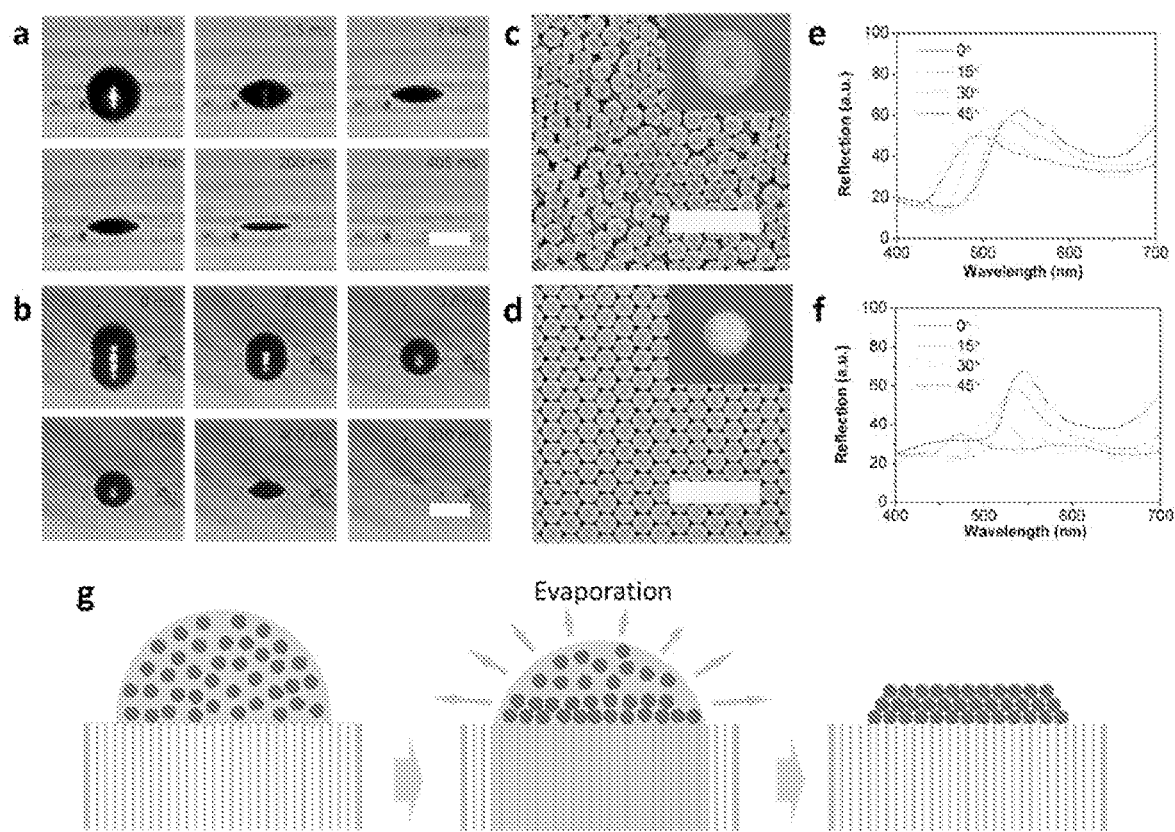
FIG. 6a shows a series of images captured by a high speed camera for the entire removal process of a water droplet on an AAO membrane with a contact angle of 60°. The white bar represents a scale bar of 100 µm.
FIG. 6b shows a series of images captured by a high speed camera for the entire removal process of a water droplet on an AAO membrane with a contact angle of 95°. The white bar represents a scale bar of 100 µm.
FIG. 6c shows a SEM image of colloidal array prepared on the corresponding AAO membrane of FIG. 6a. The inset picture shows the microscope image of printed single microdots with an integration time of 100 ms. The white bar represents a scale bar of 1 µm.
FIG. 6d shows a SEM image of colloidal array prepared on the corresponding AAO membrane of FIG. 6b. The inset picture shows the microscope image of printed single microdots with an integration time of 50 ms. The white bar represents a scale bar of 1 µm.
FIG. 6e shows the reflection spectrum of corresponding ACAs on the AAO membrane with a contact angle of 60° at increasing incidence angles.
FIG. 6f shows the reflection spectrum of corresponding ACAs on the AAO membrane with a contact angle of 95°.
FIG. 6g is used to illustrate the changes of order range in the colloidal arrays driven by evaporation.

Example 2c: Calculation of Evaporation Time of the Remaining Droplets on AAO Membranes For a diffusion-limited spherical-capped droplet with a drop deposition diameter $d_{cap}$, and an instantaneous contact angle α of a drop on the AAO membrane, the evaporation time $t_E$ is approximated by the Hu-Larson model:

$$t_E = \frac{\pi \rho d_{cap}^2}{32 D (1-H) c_v}$$

where D is the diffusivity, ρ the density of water, H is the relative humidity, and $c_v$ is the saturated vapor concentration. The calculated evaporation time for removal of remaining water in FIG. 6a and FIG. 6b was 0.24 seconds and 0.64 seconds, respectively.

Example 2d: Colloidal Assembly without IFAST

Figure 5:
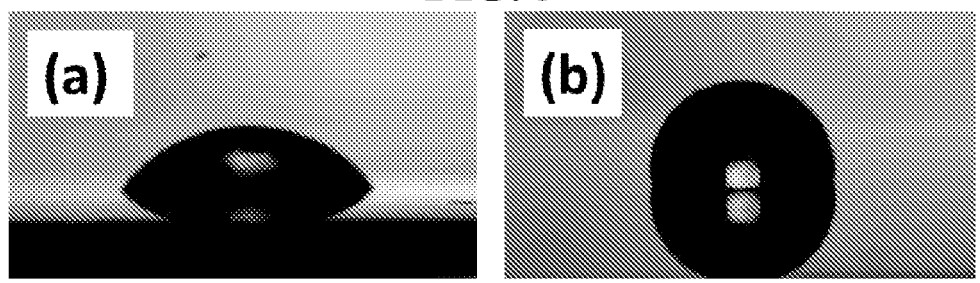
FIG. 5a shows a 5 µl water droplet on an AAO membrane that has been hydrophilically modified to give a contact angle of 60°.
FIG. 5b shows a 5 µl water droplet on an AAO membrane that has been modified to give a contact angle of 95°.
Figure 7:
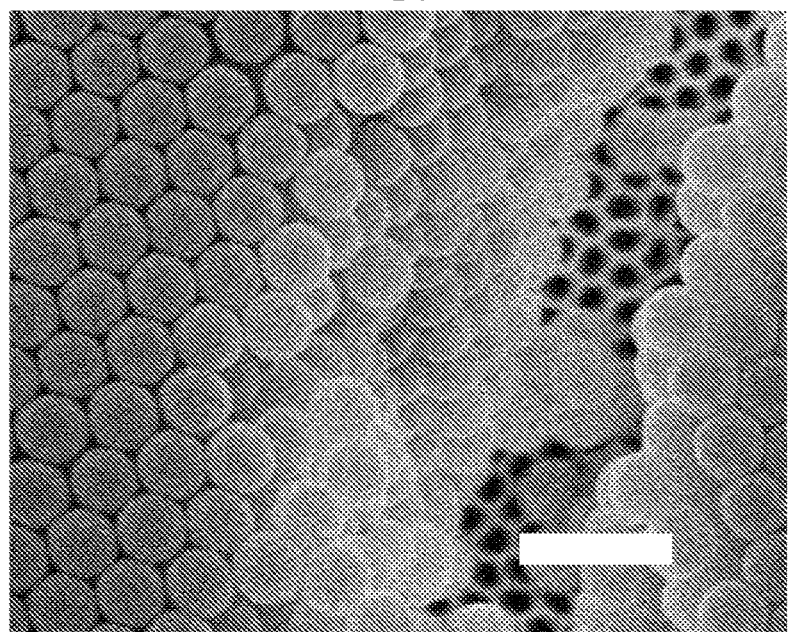
FIG. 7 shows a printed colloidal crystal (CC) on an AAO membrane with a contact angle of 95°. The scale bar represents 500 nm.

For a better understanding of infiltration driven colloidal assembly, the situation where the colloidal ink was not fully removed by infiltration was investigated. The entire removal processes of a water drop on two different AAO membranes with contact angles of 60° or 95° (FIG. 5a and FIG. 5b, respectively) are separately shown in FIG. 6a and FIG. 6b. In both cases, contact angles in pores were smaller than 90°, as the droplet volume quickly decreased in the first 3 ms to 4 ms due to infiltration. After the infiltration ended, it took another 200 ms to 800 ms for evaporation of the remaining water depending on its volume. PS colloidal droplets of similar volumes were also printed on the same AAO membrane. The colloidal arrays printed on both AAO membranes showed bright green colour, with a corresponding diameter of 115 μm and 95 μm. They exhibited a partly ordered (FIG. 6c) and long-range ordered arrangement of particles (FIG. 6d and FIG. 7), respectively. Compared with that of ACAs, the 2D-FFT pattern of partly ordered colloidal arrays (PCAs) displayed bright concentric circles with a higher number of rings (FIG. 3e), indicating a higher degree of order. The 2D-FFT pattern of CCs shows sharp hexagonal peaks (FIG. 3f), confirming the presence of long-range crystalline order. Specular reflection spectra of PCAs and CCs are also plotted in FIG. 6e and FIG. 6f. In both cases, their reflection peaks blue-shift with increasing incidence angles. But the peak shift was much smaller for PCAs due to the disorder of PCAs, as light was not only specularly reflected, but also scattered into other directions. In addition, the reflected intensity depended more on the incidence angle for the CCs, much less for the PCAs. These results also suggested that after infiltration stops, the order of colloidal arrays could be gradually tailored from amorphous to crystalline. It was reasoned that once infiltration stops, the particles were no longer fixed, and could be gradually transported back into suspension by Marangoni microflow and Boltzmann motion. As the subsequent self-assembly occurred in a near equilibrium state driven by entropy, the degree of order of the colloidal arrays therefore significantly increased.

Example 2e: Infiltration in Photo Papers

Figure 8:
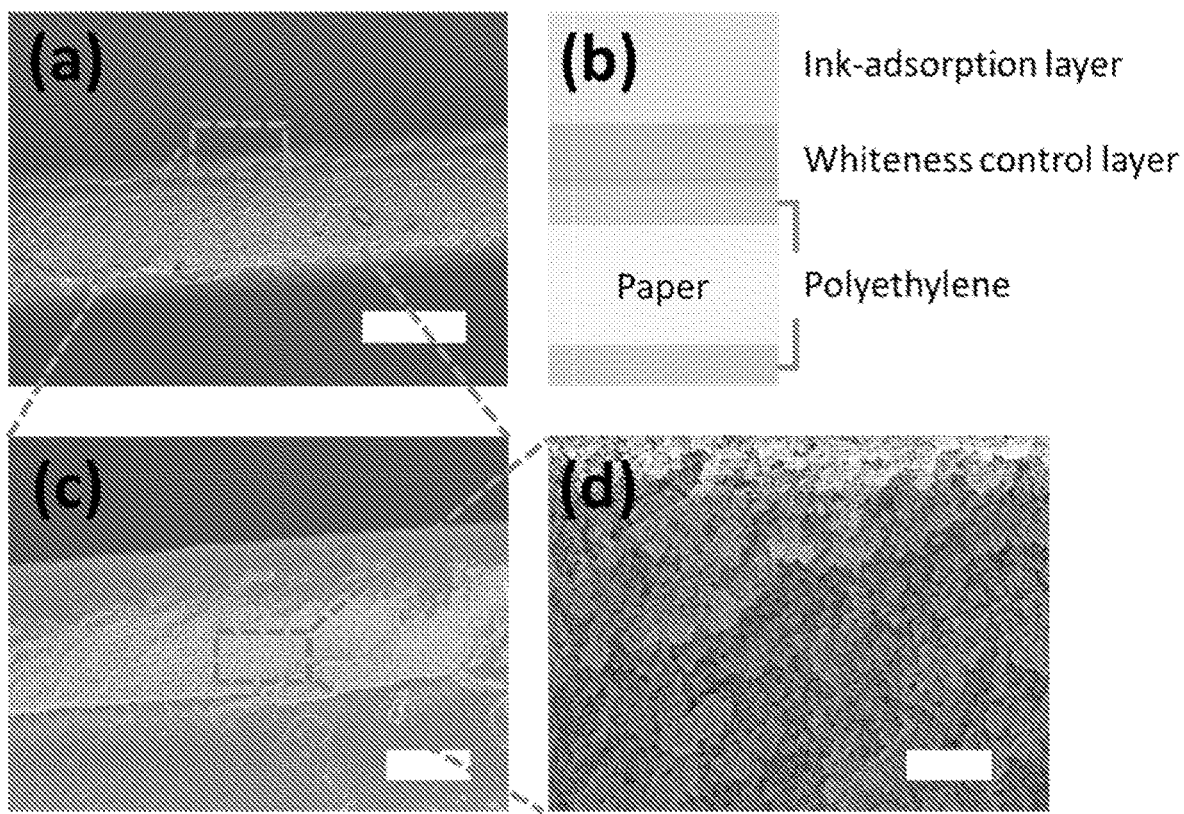
FIG. 8a shows a SEM image of a cross-side view of a photo paper. The white bar represents a scale bar of 200 µm.
FIG. 8b illustrates the composition of the photo paper.
FIG. 8c shows a SEM image of the cross-side view of the ink-adsorption layer. The white bar represents a scale bar of 20 µm.
FIG. 8d shows a SEM image of the cross-side view of the ink-adsorption layer. The white bar represents a scale bar of 1 µm.

The photo papers could be simplified into three parts: ink adsorption layer, white enhancing layer, and paper layer (FIG. 8b). The thickness of the ink adsorption layer was about 40 µm, mainly consisting of the amorphous arrangement of silica nanoparticles with diameters between 20 nm to 60 nm. The water adsorption ability of 5 pieces of photo papers with an area of 20 cm$^2$ was measured. The average weight of the photo papers before and after full adsorption of water was 0.54 g and 0.585 g, respectively. The average water adsorption rate of photo papers was, therefore, around 2.28 mg/cm$^2$. For a round photo paper with a diameter of 130 µm, it could absorb around 300 pL water. For structural colour printing using 300 pL colloidal inks, it could not lead to water saturation in the vertical direction of the photo papers, as water also moved in the lateral direction. Therefore, the downward infiltration always existed in the photo paper and provided a downward Stokes force on the particles during the whole colloidal assembly procedure.

Example 2f: Lateral Infiltration with Paper Substrate

Figure 9:
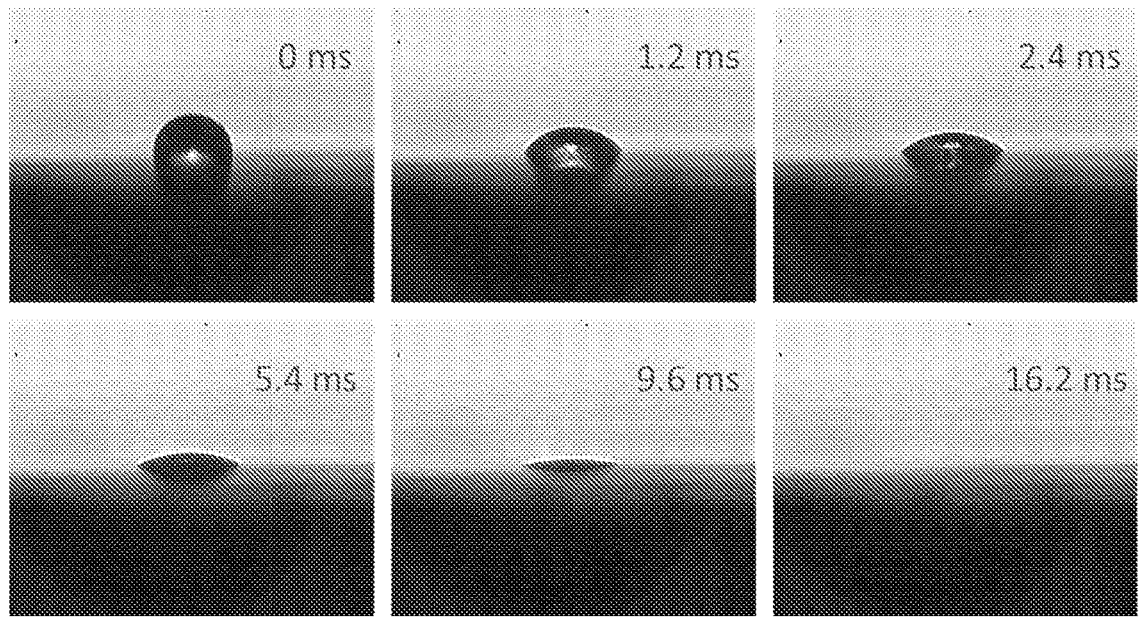
FIG. 9 shows a series of images taken by a high speed camera for the entire removal process of a water droplet with a volume of 300 pL on a photo paper.
Figure 10:
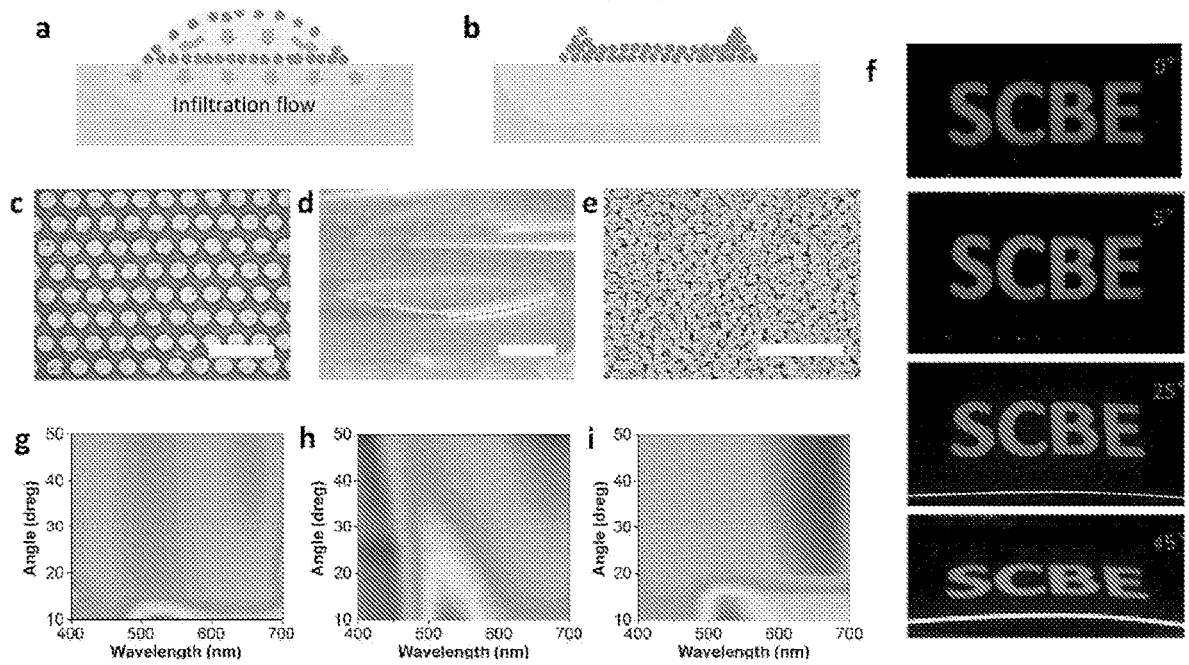
FIG. 10a illustrates the infiltration flow in papers and microflow inside a colloidal droplet.
FIG. 10b illustrates self-assembled ACAs.
FIG. 10c shows a microscope image of the printed ACA dots. The white bar represents a scale bar of 400 µm.
FIG. 10d shows a SEM image of a cross-side view of a single ACA dot. The white bar represents a scale bar of 30 µm.
FIG. 10e shows a SEM image of a top-side view of a single ACA dot. The white bar represents a scale bar of 2 µm.
FIG. 10f shows photographs of inkjet printing of the letters "SCBE" letters at different rotation angles.
FIG. 10g shows a false colour map indicating the backscattering intensity as a function of the rotation/incident angle and wavelength. Red and blue colours represent high and low intensity, respectively.
FIG. 10h shows a false colour map indicating the specular reflection intensity as a function of the rotation/incident angle and wavelength. Red and blue colours represent high and low intensity, respectively.
FIG. 10i shows a false colour map indicating the scattering intensity as a function of the rotation/incident angle and wavelength. Red and blue colours represent high and low intensity, respectively.

To manufacture isotropic structural colour patterns, papers (FIG. 8a to FIG. 8d) with strong liquid removing abilities (FIG. 9) may be highly desirable as substrate. There have been reports which investigated infiltration in papers. In contrast to infiltration in AAO membranes, lateral infiltration occurs with papers, as illustrated in FIG. 10a. The lateral infiltration leads to a lateral microflow in the colloidal ink droplet, which transports particles to edge of the droplet, and leads to the formation of a coffee ring (FIG. 10b). ACAs microdots were first produced by printing 300 pL colloidal ink droplets onto black photo papers. The printed microdots (FIG. 10c) were of well-ordered arrangement and all displayed vivid green structural colour. The SEM image of the cross-sectional view (FIG. 10d) revealed the coffee-ring structure of the microdots, and the top-view SEM image of the microdot (FIG. 10e) showed an amorphous arrangement of particles. These results suggested the successful fabrication of ACAs by IFAST printing and showed the influence of lateral infiltration on colloidal assembly on paper.

Example 2g: Optical Properties

Isotropic structural colour letters were subsequently printed to investigate their optical properties. FIG. 10f displays the optical images of letters (written using PS@PDA ink particles) rotated at different angles under natural light. The colour of letters hardly changed when the angle of rotation was varied from 0° to 45°. The ink particles' black colour help to increase colour saturation and the disorder rate. The back-scattering, specular reflection and scattering spectra of the letters were subsequently measured, using the setup in FIG. 4a to FIG. 4c. Back-scattering spectra of the letters were first captured by fixing the detection arm while rotating the sample. The false colour map (FIG. 10g) shows the back-scattering intensity of the letters as a function of the incidence angle and wavelength. When angle of rotation increased from 10° to 15°, the peak intensity dramatically decreased, and peak wavelength was blue-shifted from 532 nm to 518 nm correspondingly. Afterwards, the peak wavelength and intensity were nearly constant as the angle of rotation increased from 15° to 50°. These results suggested the colour of ACAs was almost non-iridescent with changes of rotation angles. The specular reflection and diffusive scattering spectra were subsequently measured, as shown in FIG. 10h and FIG. 10i. The angle-dependent reflection peak shift of the ACAs was clearly observed when incident and viewing angles both changed. The wavelength of scattering peaks blue-shifted from 534 nm to 512 nm when the view-angle changed from 10° to 50°. Therefore the printed structural colours were iridescent with changes of incident and/or viewing angles under direct illumination.

Figure 11:
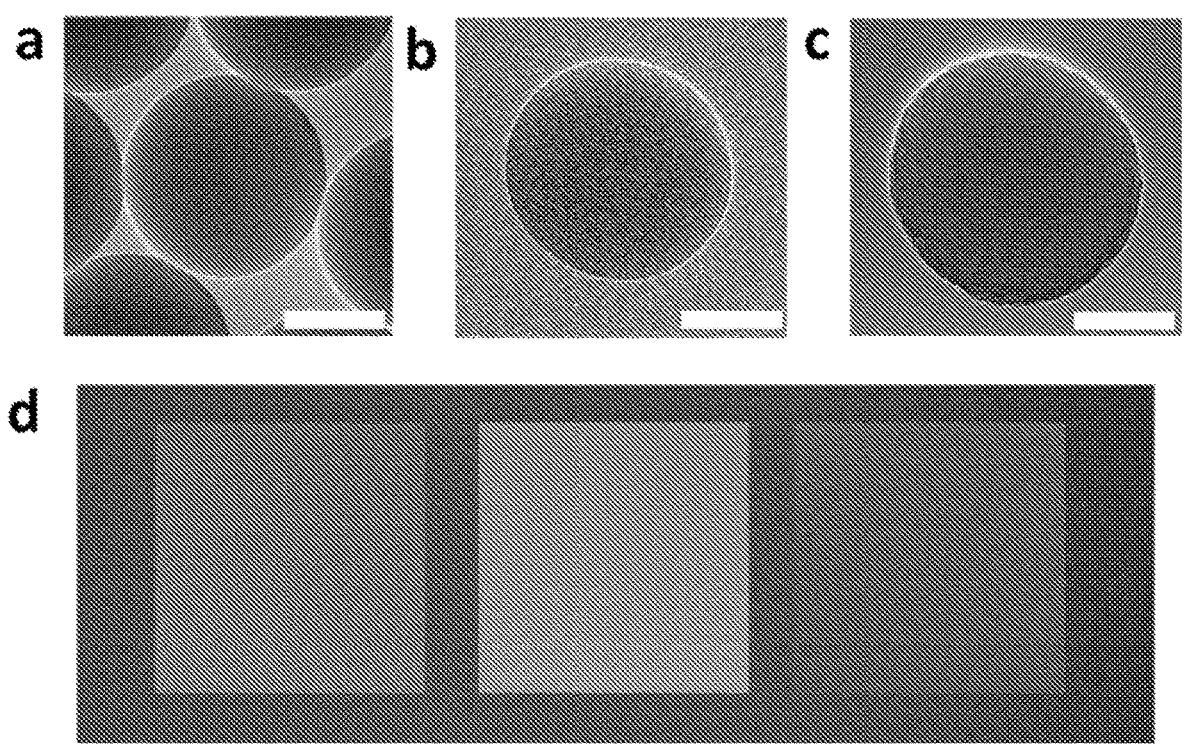
FIG. 11a shows a transmission electron microscopy (TEM) image of $SiO_2$ particles used for printing of three primary structural colours. The white bar represents a scale bar of 100 nm.
FIG. 11b shows a TEM image of polystyrene (PS) particles used for printing of three primary structural colours. The white bar represents a scale bar of 100 nm.
FIG. 11c shows a TEM image of polystyrene particles coated with polydopamine (PS@PDA particles) used for printing of three primary structural colours. The white bar represents a scale bar of 100 nm.
FIG. 11d shows an optical image of printed squares composed of the corresponding particles (left square—$SiO_2$ particles, middle square—PS particles, right square—PS@PDA particles).
Figure 12:
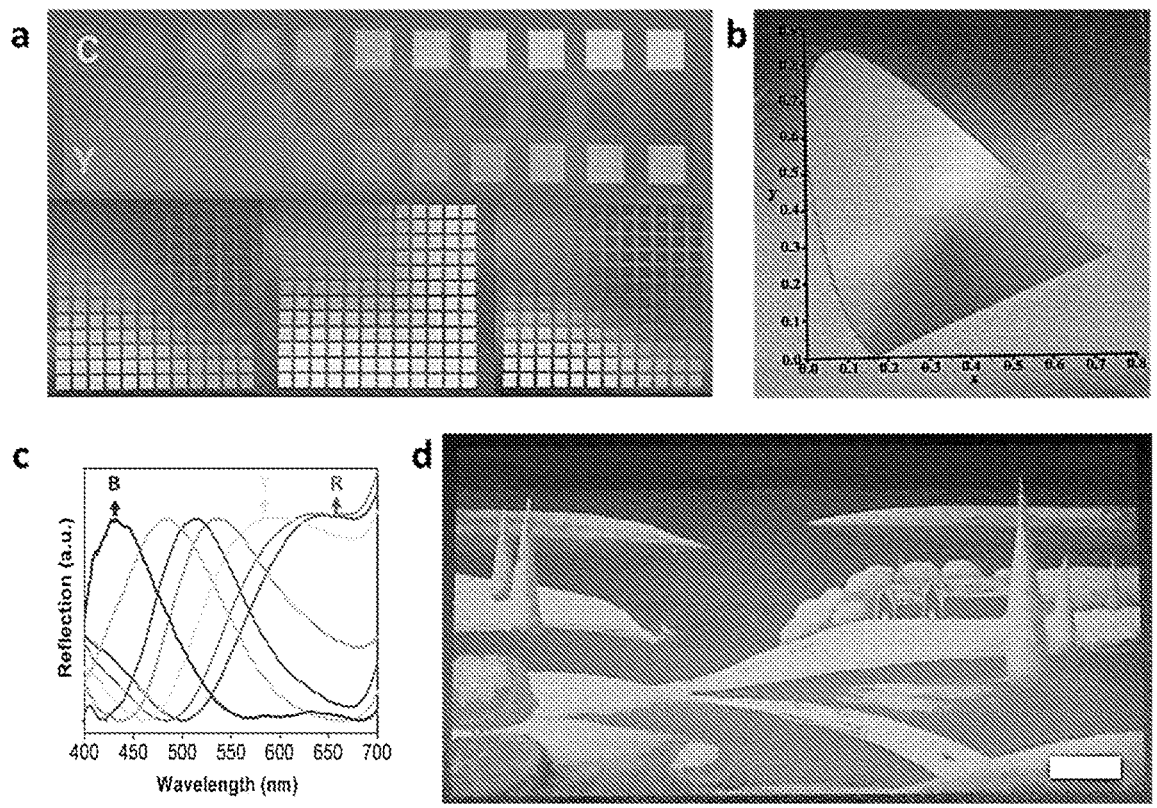
FIG. 12a shows the printed primary and secondary mixed colour chart made of cyan-yellow-red structural colours.
FIG. 12b shows an International Commission on Illumination (CIE) chromaticity diagram obtained by colour mixing of red-yellow-blue structural colours.
FIG. 12c shows normalized reflection spectrum of primary and secondary mixed structural colours in the colour chart.
FIG. 12d shows a multicoloured painting of a landscape in high resolution. The white bar represents a scale bar of 1 cm.
Figure 13:
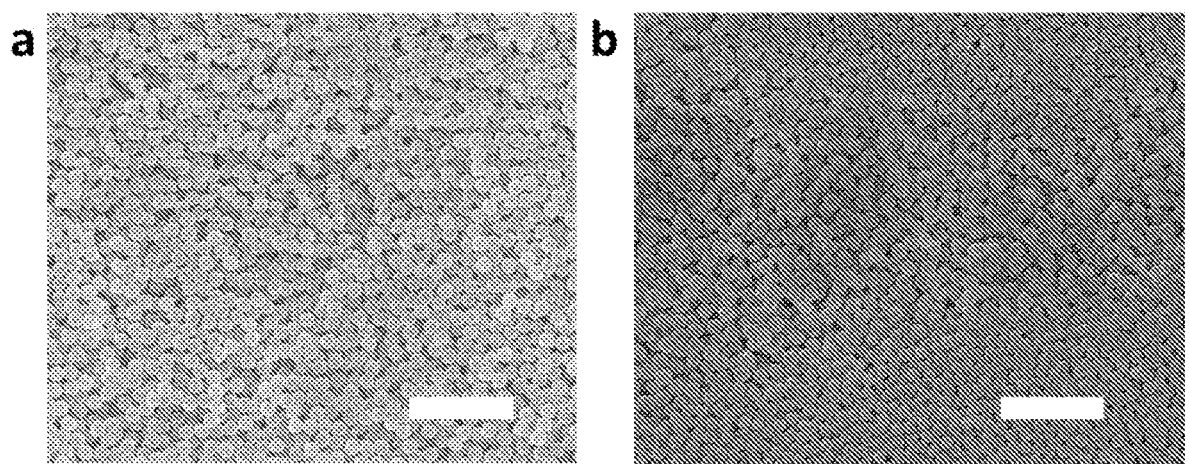
FIG. 13a shows a SEM image of the areas with primary red colour obtained by colour mixing of cyan and red colours. The white bar represents a scale bar of 200 nm.
FIG. 13b shows a SEM image of the areas with secondary pink colour obtained by colour mixing of cyan and red colours. The white bar represents a scale bar of 200 nm.
Figure 14:
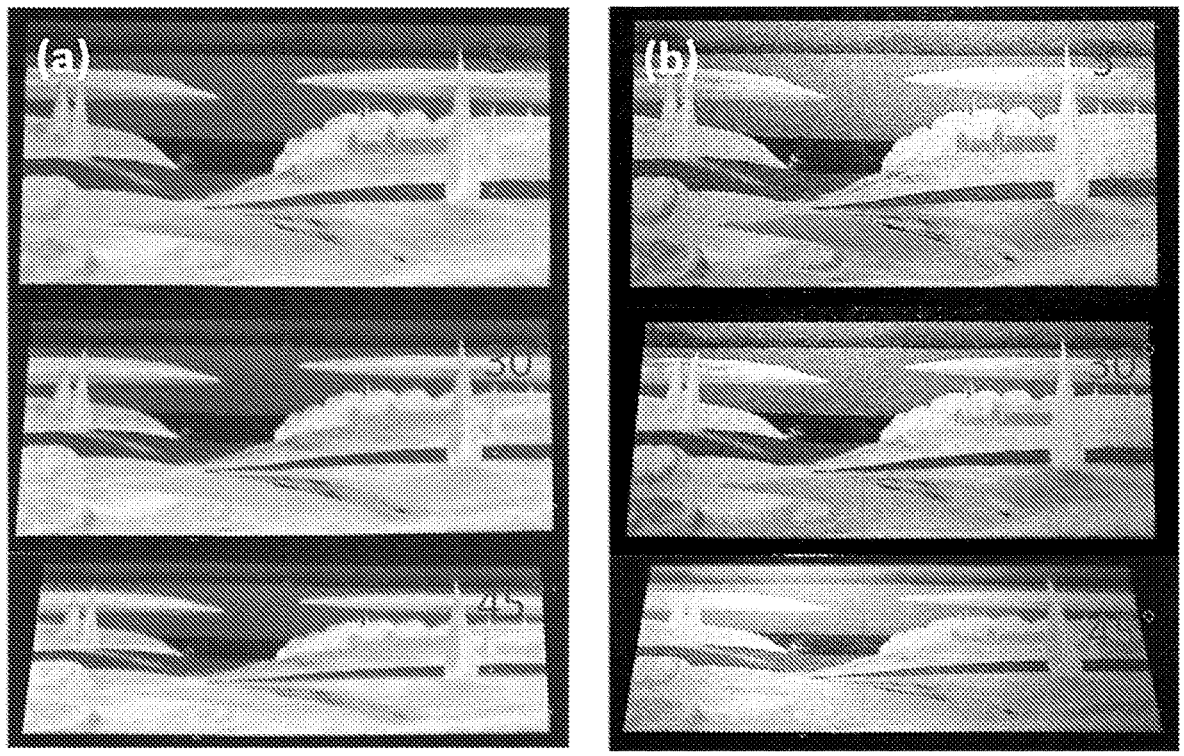
FIG. 14a shows optical photographs of a smaller landscape painting taken under natural light with different rotation angles.
FIG. 14b shows optical photographs of a landscape painting under direct illumination with changes of both incident and view-angles.
Figure 15:
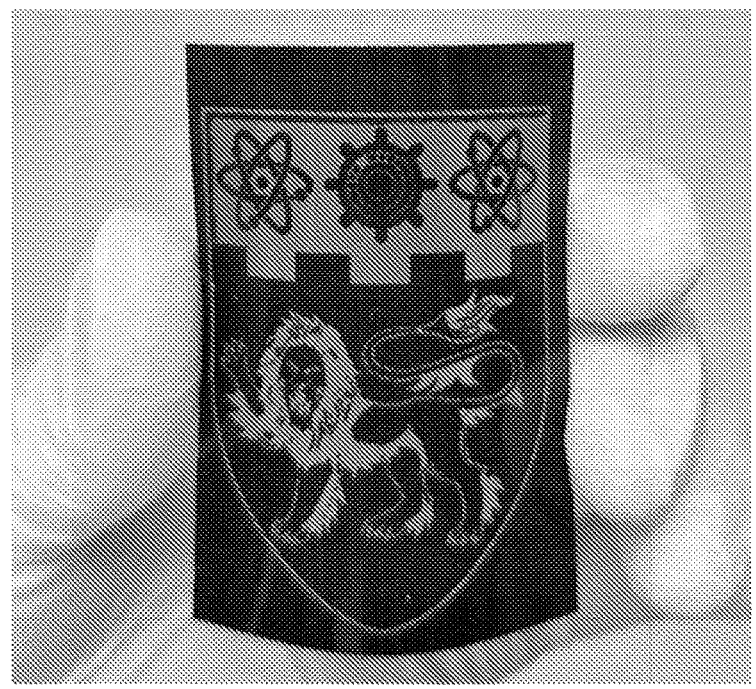
FIG. 15 shows a mechanically bended structural colour pattern.

To achieve full-spectrum isotropic structural colour printing, structural colour mixing was explored. A home inkjet printer of CMYK colour mode was used for the isotropic structural colour mixing. SiO$_2$, PS and core-shell polydopamine coated PS particles (PS@PDA) with different surface charges and properties were successfully used for isotropic structural colour printing (FIG. 11a to FIG. 11c). FIG. 12a shows a structural colour chart by secondary colour mixing of three structural colours with certain increments of percent values. The saturations of structural colours were improved with increasing percent values and by colour mixing. The hues of structural colours can also be tailored by percent values. A CIE chromaticity diagram was subsequently prepared using red-yellow-blue structural colours to explore the achievable colour gamut, as shown in FIG. 12b. By changing the CMYK percent values, structural colours covering the full spectrum were obtained. The reflection peaks of mixed colours (FIG. 12c) were between those of primary structural colours, different from the traditional subtractive CMYK colour model. These results provided guidance to design full spectrum isotropic structural colour patterns. Large-scale full spectrum isotropic structural colour printing with high resolution was subsequently demonstrated. Paintings of landscape with sophisticated colour combination and layout (FIG. 12d) were readily prepared using a home printer at a speed above 10 cm$^2$/s. Isotropic structural colours with different hues, brightness, and saturation were included in the painting, and colour transitions between neighbouring parts of the picture were very smooth. All the patterns were composed of ACAs (FIG. 13a and FIG. 13b) and displayed an almost isotropic colour under natural light but iridescent colours with changing direct illumination/viewing angles (FIG. 14a and FIG. 14b), and their colours were stable even after repeated bending (FIG. 15). These results demonstrated an extremely simple and convenient way for isotropic structural colour printing with wide viewing angles, and the great potential for design of flexible isotropic structural colour devices.

Example 3: Coating Polystyrene Particles with Polydopamine

In one example, PS nanoparticles coated with a layer of PDA were employed as colloidal inks for isotropic structural colour printing. The results demonstrated that surface coating of polydopamine (PDA) on the colloidal ink particles has an equally important role as using liquid-permeable (e.g. water-permeable) substrate in readily printing of isotropic structural colours. Dopamine self-polymerizes via successive oxidation of catechol into dopaminequinone and intermolecular cyclization, followed by oxidative oligomerization and self-assembly to form highly crosslinked, rigid PDA that can strongly adhere to various surfaces. It is likely that PDA coating on the colloidal particles leads to their improved adhesion to the surface of the substrate, which was favourable for forming ACAs. Interestingly, the strong absorption of PDA in the visible spectral range was found to suppress the coherent-light scattering observed for short-range ordered ACAs, leading to high quality isotropic structural colour patterns. The universal adhesion of PDA on colloidal particles makes it possible to develop colloidal inks of diverse chemical nature and structures for a variety of applications.

Figure 16:
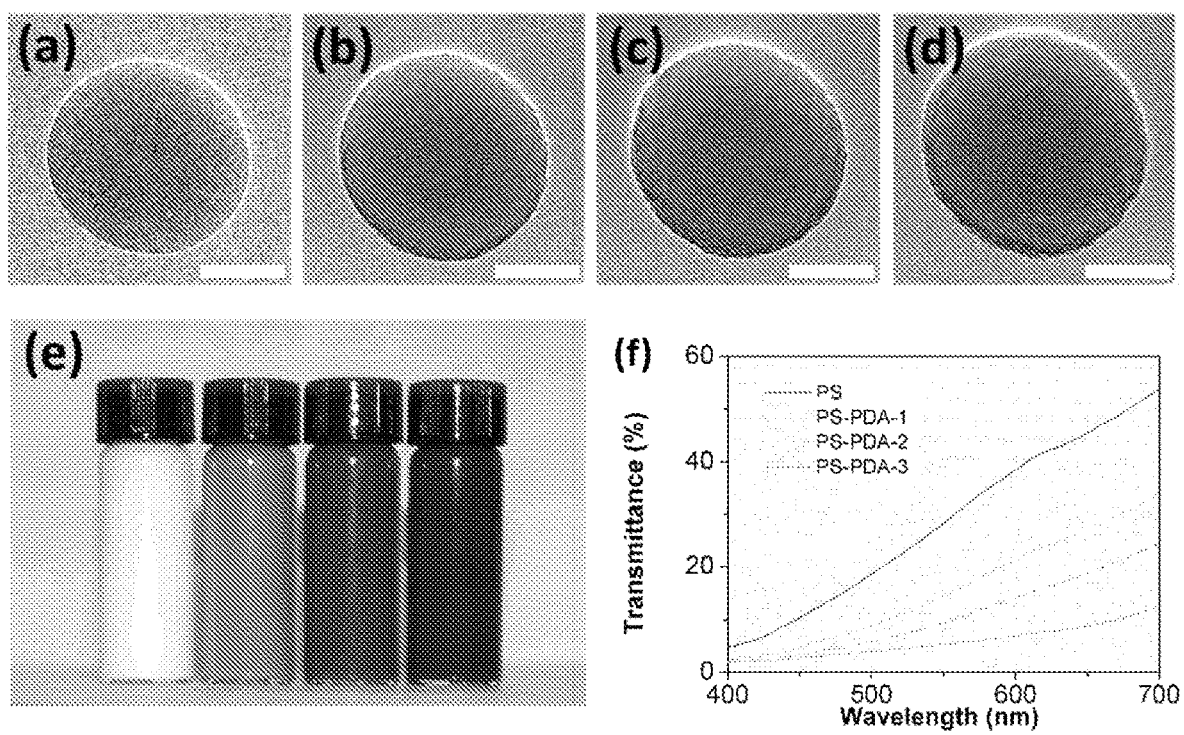
FIG. 16a shows a TEM image of PS nanoparticle.
FIG. 16b shows a TEM image of PS nanoparticle obtained with an initial dopamine amount of 100 mg (PS@PDA-1).
FIG. 16c shows a TEM image of PS nanoparticle obtained with an initial dopamine amount of 200 mg (PS@PDA-2).
FIG. 16d shows a TEM image of PS nanoparticle obtained with an initial dopamine amount of 400 mg (PS@PDA-3).
FIG. 16e shows an optical image of purified PS and various PS@PDA colloidal solutions based on the same initial PS concentration. The various PS@PDA colloidal solutions are those of FIG. 16b to FIG. 16d.
FIG. 16f shows the transmittances of PS and the various PS@PDA solutions with an initial PS concentration of 0.12 mg/ml.

PS@PDA core-shell nanoparticles with variable thickness of PDA were synthesized by using different starting concentrations of dopamine, as shown in TEM images (FIG. 16b to FIG. 16d). When a thinner layer (less than 15 nm) of PDA was loaded, the boundary between PS and PDA was not distinguishable as shown in FIG. 16b and FIG. 16c. When PDA thickness increased to 15 nm, a clear core-shell structure of PS@PDA could be observed in FIG. 16d, demonstrating the successful coating of PDA. The photograph of purified PS@PDA dispersions (FIG. 2e) revealed that the growing PDA thickness causes increased absorption of the ink particles, with their colour evolving from white for PS to brown, grey, and almost black for PS@PDA-1, PS@PDA-2, PS@PDA-3, respectively, which was favourable for the design of PCs. In line with this observation, the light transmittance (FIG. 16l) of the various PS@PDA dispersions greatly reduced with a higher amount of PDA loaded.

Isotropic structural colour printing on paper substrates was demonstrated by inkjet printing. PS@PDA inks were printed onto a commercial photo paper with strong water absorption ability. The pattern of four letters of SCBE was inkjet printed. As shown in FIG. 10f, the pattern displayed an angle-independent colour, that was from different viewangles, its structural colour stayed unchanged. FIG. 10c displayed the microstructure of the ACA microdots. These microdots were of an ordered arrangement, which was due to the high resolution of inkjet printing technology. The top-view SEM image of an ACA microdot is shown in FIG. 10e. From the image, it is observable that the nanoparticles were of a disordered arrangement, which was responsible for the angle-independent structural colour.

Figure 17:
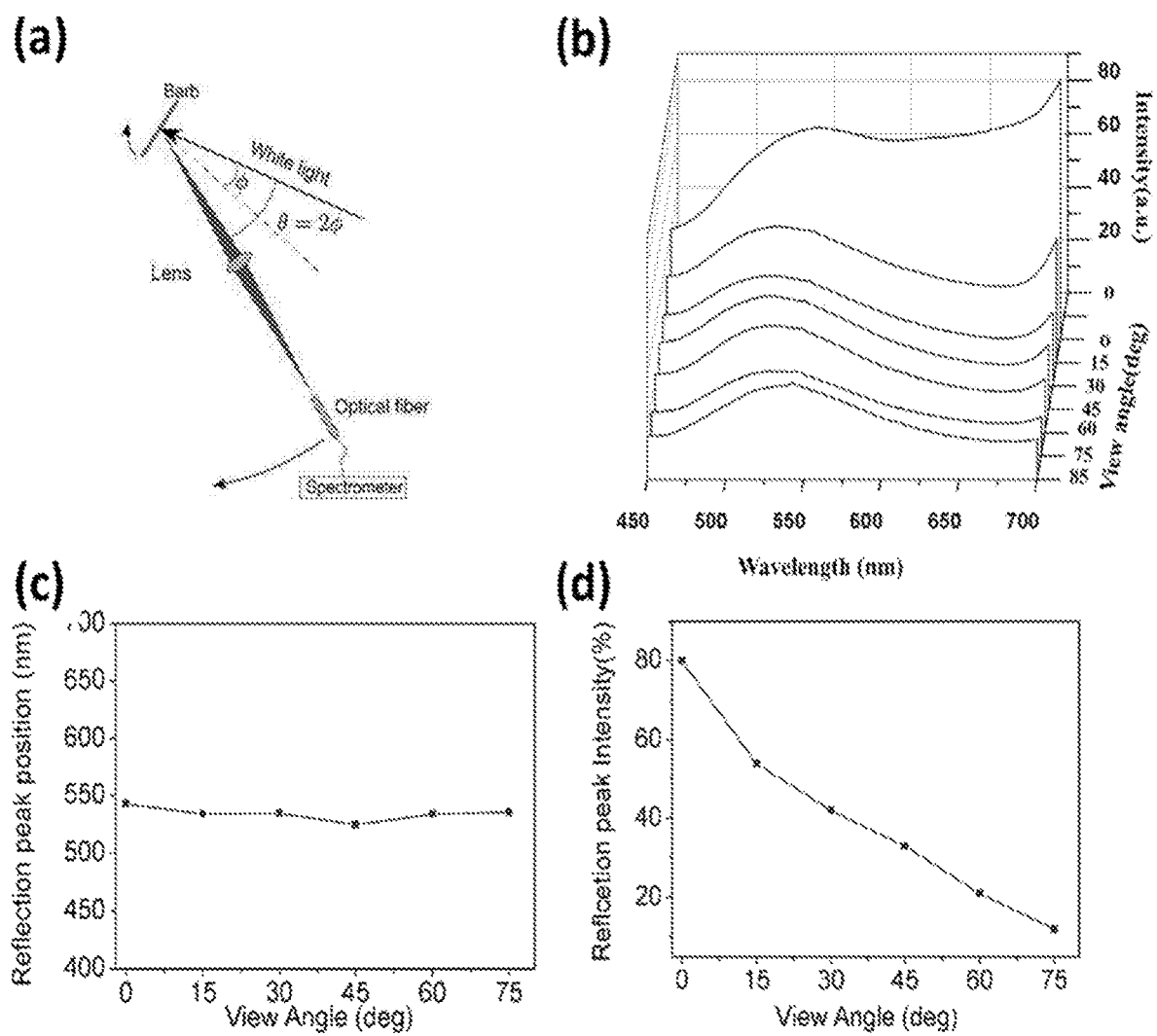
FIG. 17a shows a schematic of an optical setup for measuring the reflection spectra of ACA patterns.
FIG. 17b shows the reflection spectrum of ACA patterns at different view-angles.
FIG. 17c shows the reflection peak position at different view-angles.
FIG. 17d shows the normalized reflection peak intensity at different view-angles.

Referring to the optical setup depicted in FIG. 17a the reflection spectrum of ACA patterns at different view-angles were measured. The results confirmed that the reflection peak position changed little at different viewing angles, as shown in FIG. 17b. The reflection peak position and intensity are also shown in FIG. 17c and FIG. 17d. In contrast, the patterns of the same PS@PDA inks on a water-impermeable Si wafer clearly showed angle-dependent structural colour (FIG. 18a and FIG. 18b) due to the long-term ordered arrangement (FIG. 18c to FIG. 18d), further highlighting the contribution of water-absorbing substrate in the formation of ACAs.

Example 4: Device for Writing with Ink Composition

Figure 18:
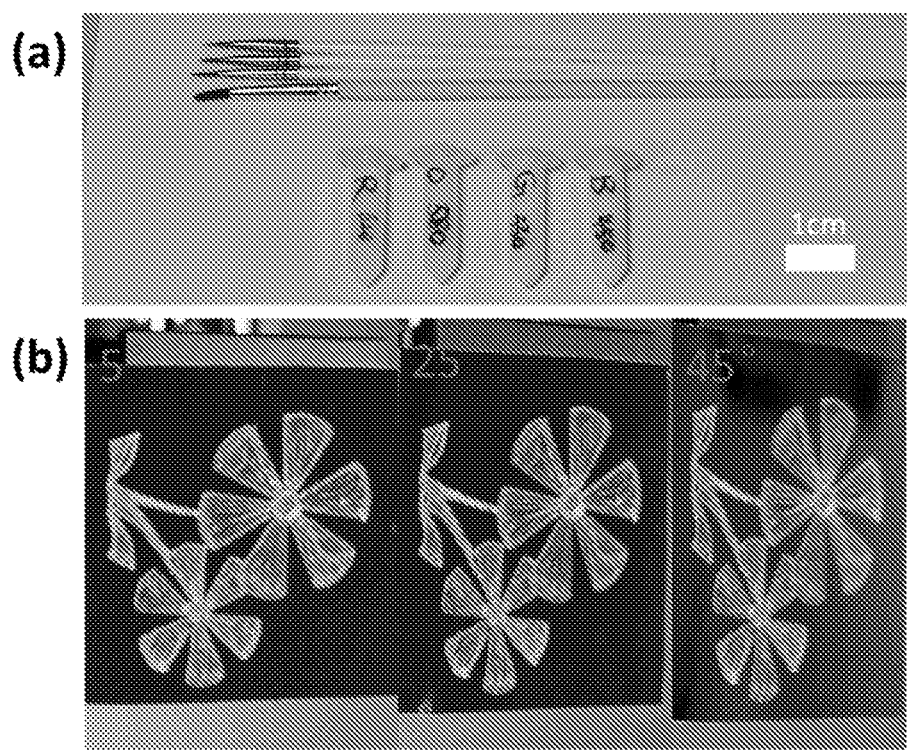
FIG. 18a shows that the structural colour inks, in each eppendorf tube, can be used with colour brushes for directly painting angle-independent structural colours.
FIG. 18b shows isotropic structural colour patterns rotated at different angles written using the brush of FIG. 18a based on PS colloidal inks.

Structural colour brushes for directly writing angle-independent structural colours are shown in FIG. 18a. Structural colour painting was obtained using the brush. By using different kinds of inks, for example, PS colloidal inks with different sizes, structural colour paintings with multiple colors (FIG. 18b) were obtained. It was clear that the structural colour of PS@PDA painting is isotropic and its colour was bright and uniform.

Example 5a: Ink Composition Based on MOFs

Metal-organic frameworks are a class of hybrid porous crystalline materials constructed through coordination between metal ions/clusters and organic ligands. MOFs have attracted great interest due to their large surface areas, high porosity, structural variety, and chemical tailorability. These fascinating properties make MOFs promising materials for an extraordinary variety of applications, such as gas storage and separations, catalysis, drug delivery, physical or chemical sensors, optoelectronics and images. In particular, their rich host-guest chemistry, excellent sorption kinetics, reversible response to external stimuli have drawn considerable attention for developing chemical sensors. Examples of MOFs chemical sensors include those based on luminescence quenching or changes of structural colours. Compared to luminescence MOFs which use luminescent quenching for chemical sensing, the signal transduction mechanism for structural colour sensing is different. The structural colours of MOFs sensors originate from light interaction with their spatial ordered structures. Selective capture of small molecules in the cavities of MOFs sensors leads to changes of effective refractive index or periodic lattice parameters of the photonic structures, and causes responding colour changes or reflection peak shifts. As it is theoretically possible for integration of most MOFs into structural colour sensors, MOFs may be used to develop structural colour sensors.

Conventionally, MOFs structural colour sensors have been successfully fabricated by integration of MOFs into Fabry-Perot interference films, 1-D Bragg stacks, hybrid colloidal crystals or inverse opals. However, their fabrication takes a long time, multiple steps, and suffers from low efficiency and reproduction issues. Due to the difficulty in synthesis of uniform MOFs particles and self-assembly of non-spherical building blocks, bottom-up colloidal assembly of MOFs particles into colloidal crystals (CCs) or other three-dimensional structural colour materials remains a challenge. The present approach ameliorates one or more of these issues.

The present approach, which may be referred to as an IFAST printing method, fabricates amorphous colloidal arrays (ACAs) on a large scale. The rapid infiltration in substrates (e.g. porous substrates like papers) can fix the particles by downwards micro-flow, hinder the colloidal crystallization and lead to formation of ACAs with bright colours in milliseconds. The colours of ACAs are of low angle-dependence due to their short range orders, which is important for construction of structural colour devices with wide viewing angles. Moreover, high monodispersity and strictly spherical shape of the particles are not essential for colloidal assembly of ACAs, which is highly desirable for fabrication of MOFs structural colour devices. In this regard, the present approach is also extended to produce MOFs for structural colour printing, such as self-assembly of near-spherical ZIF-8 particles. The present approach also extends the IFAST printing for construction of ZIF-8 ACA vapour sensors.

Example 5b: Present Approach Based on ZIF-8 Collodial Particles (MOFs)

For the synthesis of ZIF-8 colloidal particles, 30 mM 2-methylimidazole (MIM) and 250 mg poly(vinylpyrrolidone) (PVP) and 24.6 mg of sodium acetate (NaAC) were dissolved and mixed in methanol (50 ml). To this solution, another methanol solution of 15 mM $Zn(NO3)_2.6H_2O$ was added and mixed, the reaction was incubated at room temperature for 12 hours to 24 hours. 1 ml NaAC used was added to the reaction solution to stop the reaction. The formed particles were collected by centrifugation and washing with methanol multiple times before they were redispersed in MeOH at 5 wt % concentration.

For the preparation of ZIF-8 thin films, the ZIF-8 colloidal array thin films were fabricated by a vertical deposition method. The suspensions used for the fabrication were ethanol-based, which contained 1 wt % ZIF-8 particles. The temperature was kept at 298 K and humidity was set at 70% for the films' synthesis.

For the IFAST printing of ZIF-8 ACAs, the printing inks were prepared by dissolving 40 mg ZIF-8 colloidal particles into a mixture of 800 μl ethanol and 200 μl ethylene glycol. ZIF-8 ACA patterns and sensors were obtained by printing on photo papers using a Jetlab® 4 tabletop printing platform.

The printed structural colours were then characterized. SEM images of CCs and ACAs were conducted on a field emission scanning electron microscope (JSM-6700F, Japan). TEM images of particles were acquired on a Jeol JEM2010 electron microscope. XRD measurements were performed on a $D_2$ Phaser XRD machine. $N_2$ adsorption-desorption isotherm was measured on an ASAP 2020 instrument at 77 K. Optical graphs were captured by a digital camera (EOS 700D, Canon). Micrographs were acquired by a CCD camera (CoolSnap, Photometrics), which was directly aligned to the inverted microscope (IX71, Olympus). Reflection spectra were recorded using a fiber optic UV-vis spectrometer (Ocean Optic HR2000CG).

Example 5c: Results and Discussion—Characterization of ZIF-8 MOFs

Figure 19:
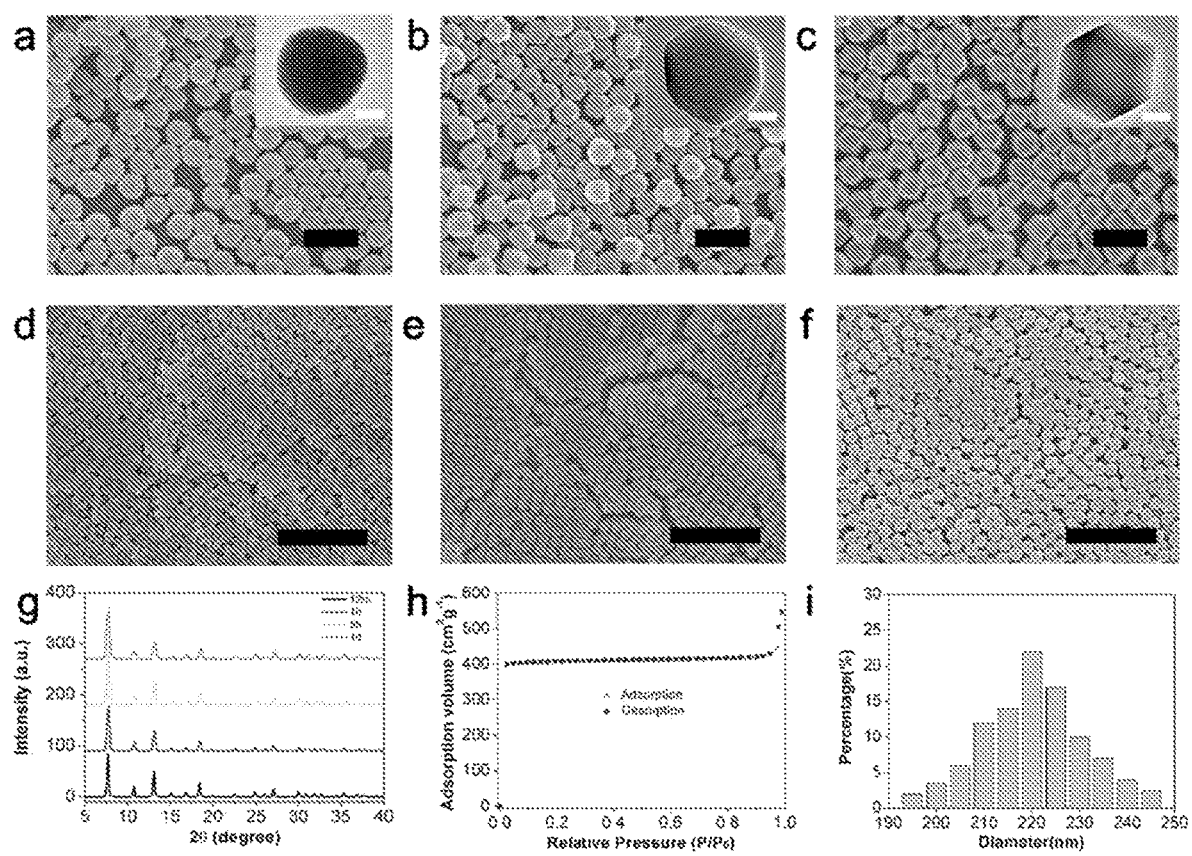
FIG. 19a shows a SEM image of ZIF-8 particles generated after 15 minutes. The black bar represents a scale bar of 2 μm. The inset shows the TEM image of a corresponding particle. The white bar in the inset of the TEM image represents a scale bar of 50 nm.
FIG. 19b shows a SEM image of ZIF-8 particles generated after 1 hour. The black bar represents a scale bar of 2 μm. The inset shows the TEM image of a corresponding particle. The white bar in the inset of the TEM image represents a scale bar of 50 nm.
FIG. 19c shows a SEM image of ZIF-8 particles generated after 12 hours. The black bar represents a scale bar of 2 μm. The inset shows the TEM image of a corresponding particle. The white bar in the inset of the TEM image represents a scale bar of 50 nm.
FIG. 19d shows a SEM image of ZIF-8 particles with an average size of 180 nm. The black bar represents a scale bar of 2 μm.
FIG. 19e shows a SEM image of ZIF-8 particles with an average size of 230 nm. The black bar represents a scale bar of 2 μm.
FIG. 19f shows a SEM image of ZIF-8 particles with an average size of 270 nm. The black bar represents a scale bar of 2 μm.
FIG. 19g shows the X-ray diffraction (XRD) patterns of ZIF-8 particles generated at different times.
FIG. 19h shows the $N_2$ adsorption/desorption isotherm of the ZIF-8 near-spherical particles.
FIG. 19i shows the particle size distribution of the average diameters of ZIF-8 near-spherical particles.

Monodisperse ZIF-8 colloidal particles with near-spherical shapes were first synthesized by using dual capping ligands, namely NaAC and PVP. During the growing process, the shape of ZIF-8 particles gradually changed from near-spherical shapes to polyhedrons within 12 hours, as shown in FIG. 19a to FIG. 19c. As ZIF-8 particles synthesized without PVP turned out to be polyhedrons, this suggested that introducing PVP with a high concentration could slow down the growing of {100} and {110} facets of ZIF-8 polyhedrons, probably because of the charge screening function of adsorbed PVP. The PVP also stabilized the shapes of ZIF-8 particles, their intermediate morphologies were stable in methanol or ethanol for several weeks. By introducing capping ligands NaAC, the size of ZIF-8 particles were well controlled. As shown in FIG. 19a to FIG. 19c and FIG. 19d to FIG. 19f, when the concentration of NaAC changed from 0 to 3 mM, the corresponding size of ZIF-8 particles changed from 180 nm to 270 nm. The NaAC inhibited the ionization of methyl imidazole (MIM), and suppressed the nucleation points, which finally increased the size of ZIF-8 particles. X-ray diffraction (XRD) patterns of ZIF-8 particles with a reaction time of 10 minutes, 1 hour, 5 hours and 1 day are shown in FIG. 19g. The XRD patterns confirmed the crystalline nature and identity of the ZIF-8 materials of all particles, indicating that the ZIF-8 particles with intermediate or polyhedral morphologies were useful for construction of ZIF-8 structural colour devices. The ZIF-8 near-spherical particles obtained after 15 minutes were further investigated, as their shapes were more appropriate for colloidal assembly. $N_2$ adsorption/desorption isotherm in FIG. 19h demonstrated a large surface area and high porosity of ZIF-8 near-spherical particles, which was promising for vapour sensing. The average size of every particle was measured for analysis, as shown in FIG. 19i. The distribution of average size of particles was narrow (CV=4.6%), which was appropriate for self-assembly of colloidal crystals if using spherical particles.

Example 5d: Infiltration Studies of ZIF-8 MOFs

Figure 20:
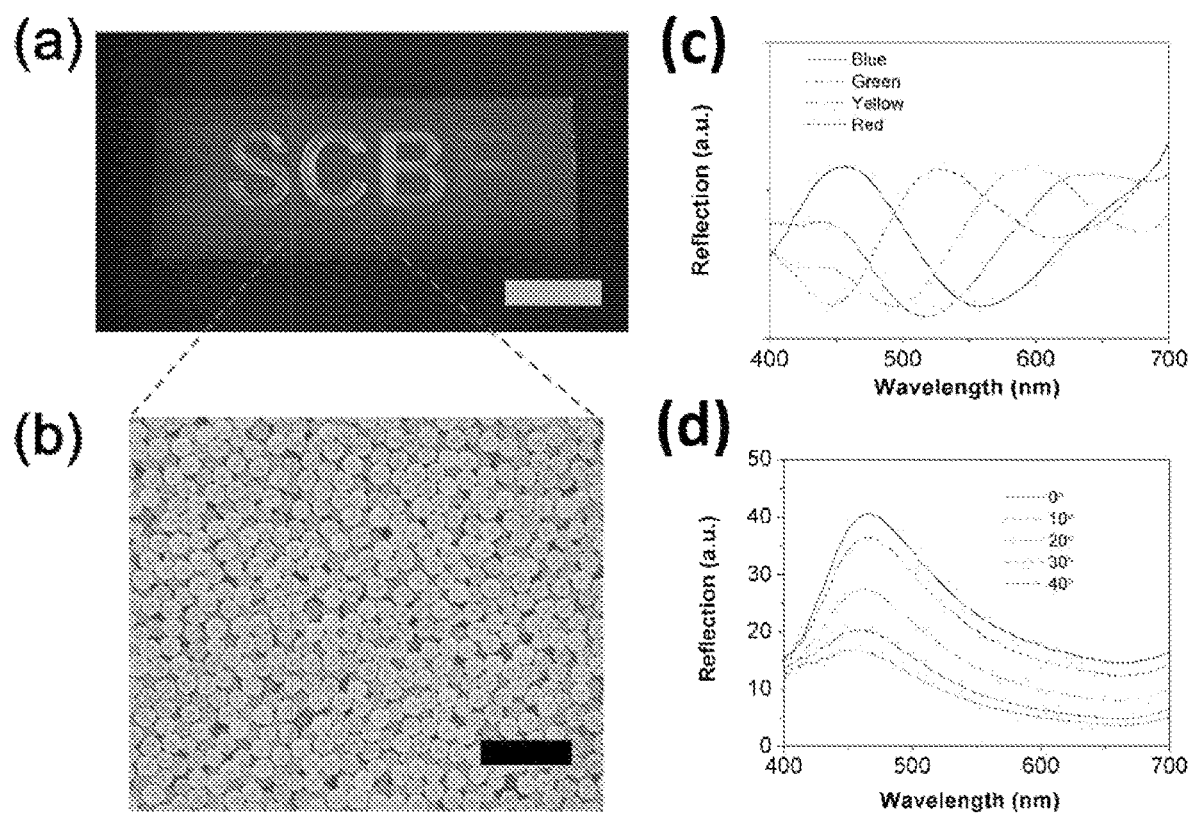
FIG. 20a shows an optical image of ZIF-8 ACA letters with different colours. The grey bar represents a scale bar of 2 cm.
FIG. 20b shows a SEM image of the ACA letter with green colour.
FIG. 20c shows the reflection spectrum of the four letters.
FIG. 20d shows the reflection spectrum of the printed letters with different rotation angles.

Infiltration driven colloidal assembly of ZIF-8 near-spherical particles was subsequently investigated. For this example, 5 wt % ZIF-8 particles were dissolved in 80 vol % ethanol-20 vol % ethylene glycol and photonic paper was used as the substrate. Multiple colour ZIF-8 ACA letters (FIG. 20a) were first prepared by IFAST writing using four different near-spherical particles. Because the fast downwards infiltration flows suppressed crystallization of ZIF-8 particles, the four letters all displayed an amorphous arrangement of ZIF-8 particles, as shown in FIG. 20b, indicating the successful fabrication of ZIF-8 ACAs. Reflection spectra of four letters were subsequently measured, as shown in FIG. 20c. As the colours of ZIF-8 ACAs mainly originated from constructive interfere of lights scattered by ZIF-8 near-spherical particles, the reflection peak positions were almost proportional to the average sizes of ZIF-8 particles (see FIG. 22a to FIG. 22d). Reflection spectra of the letters (FIG. 20d) was also measured by fixing the detection arm while rotating the sample. The peak wavelength hardly moved when rotation angles changes from 5° to 50°, indicating a non-iridescent colour of ZIF-8 ACA letters.

Example 5e: Investigation of ZIF-8 ACAs for Vapour Sensing Applications

Figure 21:
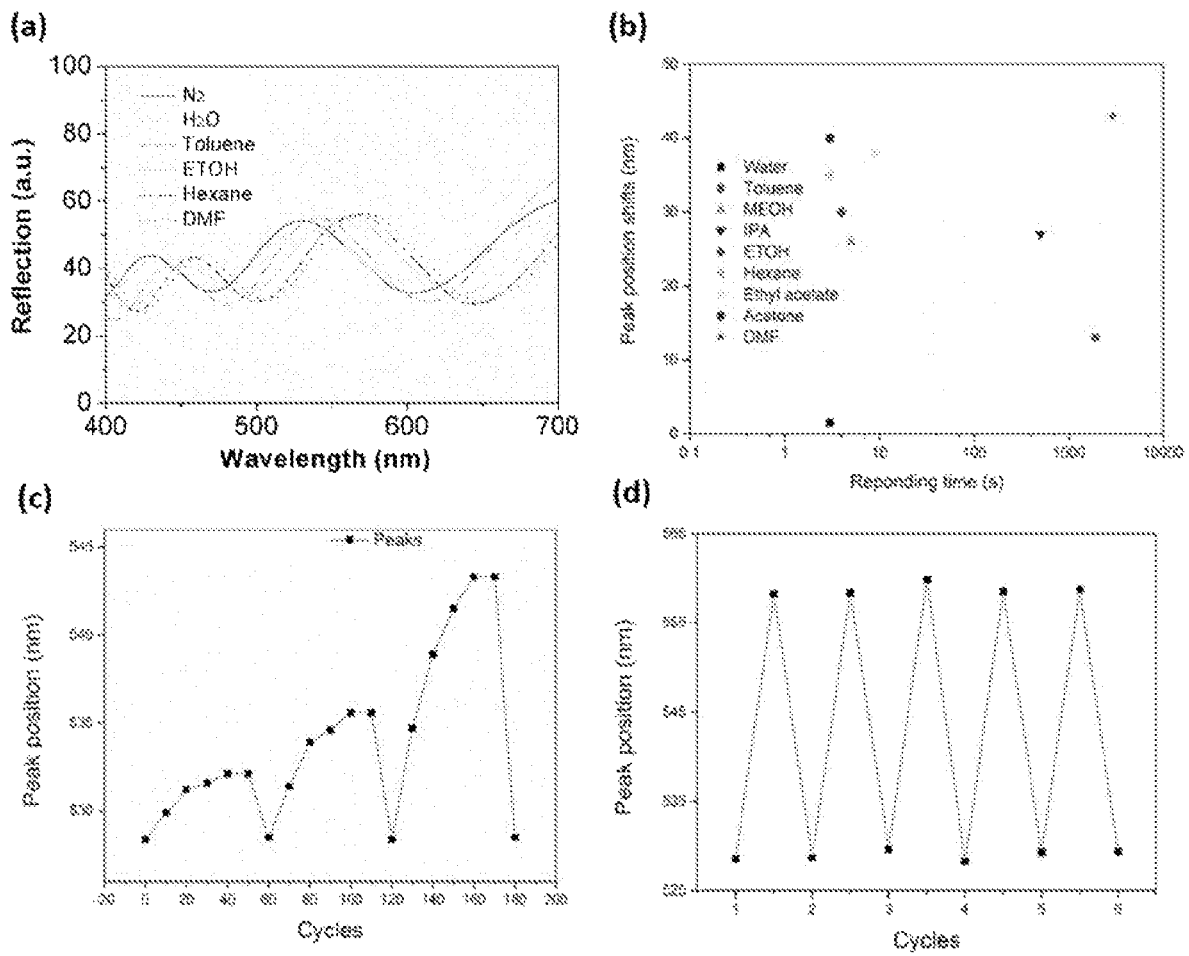
FIG. 21a shows the reflection spectrum of the as-prepared ZIF-8 ACA sensors upon exposure to $N_2$/ethanol vapours.
FIG. 21b shows the reflection peak shifts and responding times of the sensor in response to different organic vapours.
FIG. 21c shows the kinetic response of ACAs sensors to DMF vapours with concentrations of 20/100/1000 ppm.
FIG. 21d shows the recoverability of ACAs sensors exposed to $N_2$ (heated at 100° C.) and saturated ethanol vapour over 5 cycles.
Figure 22:
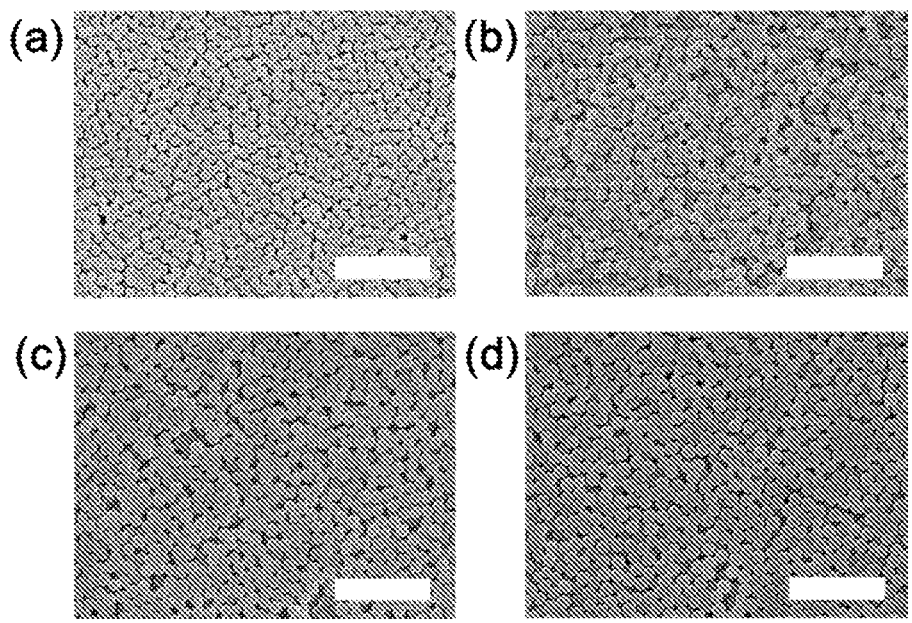
FIG. 22a shows SEM image of ZIF-8 near spherical particles with a size of 195 nm.
FIG. 22b shows SEM image of ZIF-8 near spherical particles with a size of 230 nm.
FIG. 22c shows SEM image of ZIF-8 near spherical particles with a size of 255 nm.
FIG. 22d shows SEM image of ZIF-8 near spherical particles with a size of 280 nm.

The application of ZIF-8 ACAs for vapour sensing was subsequently investigated. IFAST written ZIF-8 ACA sensors were first dried at 70° C. under vacuum to remove the absorbed water moisture and solvent molecules in its micropores. The sensor was then exposed to ethanol vapour for detection. The reflection spectrum in FIG. 21a showed that the reflection peak of structural colour sensor redshifts from 529 nm to 564 nm on exposure to saturated ethanol vapours. This suggested that the ethanol molecules were captured in the micropores of ZIF-8, which led to a change of refractive index and lattice parameters of ZIF-8 particles, and thereby caused reflection peak shifts of structural colour sensors. Afterwards, the responses of the ZIF-8 ACA sensor to water and other organic vapours were recorded, as shown in FIG. 21b. The ZIF-8 ACA sensor was hardly responsive to water vapour (red-shifted 1.4 nm) but showed distinct reflection peak shifts towards other vapours. This demonstrated the strong hydrophobicity of ZIF-8, and indicated that the uptake of guest molecules in ZIF-8 highly depends on the physicochemical properties of molecules and their affinity to the adsorption sites. Besides, the responding speed (FIG. 21b) of the sensor to the vapours were different, which represented the diffusion rates of corresponding vapour analytes in the ZIF-8 particles. As the diffusion rates of vapours in ZIF-8 ACAs were not only determined by the guest molecule's physicochemical properties and their affinity to adsorption sites but also based on their sizes, shapes and concentrations. Therefore, the selectivity of the sensor was significantly improved if the dynamic uptake process was monitored. Dynamic reflection peak shifts of the sensor to DMF vapours with concentration of 20 ppm, 100 ppm and 1000 ppm were investigated as shown in FIG. 21c. The uptake speed of DMF was faster in the beginning due to adsorption of DMF on the surface of ZIF-8 nanoparticles. For DMF vapour of 20/100/1000 ppm, the reflection peak shifted 2.6/4.2/10.3 nm, respectively, which suggested a high sensitivity of the ZIF-8 ACA sensor. The recovery of the ZIF-8 ACA sensors was subsequently investigated, FIG. 20d showed the peak shifts on exposure to ethanol and $N_2$ (heated at 100° C.) were reversible and repeatable, which indicated a good reproducibility of the sensor.

Based on the results for MOF, in summary, the present approach provides for a facile route to synthesize structural colours based on monodispersed ZIF-8 colloidal near-spherical particles. The fabrication of ZIF-8 colloidal array thin films and ACAs through colloidal assembly are also demonstrated. In particular, through the IFAST writing method of the present disclosure, ZIF-8 ACAs with non-iridescent colours were successfully applied for vapour sensing, which showed good sensitivity, selectivity and recovery. It is substantiated that the present approach provides for a simple way of fabricating MOFs structural colour sensors through bottom-up colloidal assembly, and makes it possible to construct miniaturized, patterned MOFs structural colour devices with a wide range of potential applications.

Example 6: Commercial and Potential Applications

Compared with existing technologies, the present approach (i.e. process) is cost-effective and allows for rapid printing of isotropic structural colours, and the isotropic or anisotropic level of structural colour can be precisely controlled. The use of colloidal ink and liquid-permeable substrates such as paper make it compatible with traditional printing technologies like inkjet printing, Toppan or gravure printing. More interestingly, it is also possible to directly write or paint arbitrary letters/patterns with isotropic structural colour on papers using pens or brushes based on the present process.

In summary, a universal and versatile approach for rapid fabrication of ACAs through infiltration driven colloidal assembly on liquid-permeable substrates have been developed. The flowing colloidal suspensions directed by strong infiltration are far from equilibrium, suppressing colloidal crystallization but favouring formation of ACAs. Rapid, scalable, high-resolution and full-spectrum structural colour patterns on liquid-permeable substrates are achieved by IFAST printing, offering unprecedented flexibility in fabricating structural colour patterns. A variety of colloidal particles and inks can be used for further development of structural colour devices with tailored optical properties and functionalities. The substrates for IFAST printing are not limited to AAO membranes or photo papers, any substrates that are liquid-permeable but particle-impermeable are suitable for the present process. The present process is of great potential for fabricating flexible sensors and full-colour paperlike displays. By controlling liquid infiltration in the substrates, it is possible to develop sophisticated photonic structures with tailored spatial order or disorder, which is also important for fundamental study of Anderson localization or coherent back-scattering of lights as well as applications of random lasers or solar cells. Non-limiting examples of applications of the present process is further discussed below.

The present process can be used for creating optical variable security devices as large scale, high-resolution structural colour patterns with vivid colour can be readily created on banknotes, papers, books, clothes and other commodities. In one example, $SiO_2$ particles can be printed on photo papers/banknotes to create anti-counterfeiting patterns. The optical variable properties (angle-dependent or angle-independent) of the security devices can be precisely controlled by designing substrates and choosing particular inks (particles). For example, the substrates can be designed to be oil-permeable for oil-based inks. Combined with water-based printing systems, it is compatible with almost all printing technology. Another example is that, if the particles used also have inherent optical properties, such as fluorescent/plasmonic effects, the optical variable properties of the security labels are much more complex and hard to counterfeit.

The present process also provides for structural colours in sensor array. The present method can be used to create structural colour sensors that detect analytes (vapours, biochemical sensing) based on colour shifts. Some of the advantages for such application are:

(1) The present method provides a simple and repeatable way for mass industrial production of structural colour sensors. The composition of inks can be flexibly designed. For example if a temperature is to be detected, the temperature responsive monomers (N-Isopropylacrylamide) and photo-crosslinking agent can be dissolved in the ink. The photo-polymerization of NIPAM and the formation of ACAs will take place at the same time, and form a temperature sensor that can display colour changes in response to different temperatures. It is possible to use the present method to design paper based optical sensors for detection of simple analytes such as protons (pH values), heavy ions or small molecules.

(2) The analyte-responsive particles such as MOFs and mesoporous particles can also be used for creating vapour or liquid responsive sensors. The adsorption of vapor or liquid in the porous particles may increase the reflective index of the particles and lead to colour changes. As the adsorption of analytes are different in these particles, the analytes can be distinguished.

(3) It is also possible to design sensor arrays for multiple sensing for point-of-care. For example, if a disease is to be detected, the sensors can be designed for particular indicators of the disease. For certain compounds (bisphenol A, cholesterol, $Pb^{2+}$, etc.), the sensitivity of the sensors can even reach 100 ng/ml.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. An isotropic structural colour printing process comprising:
 a) providing an ink composition comprising ink particles in a liquid reagent;
 b) depositing the ink composition onto a surface of a substrate, wherein the liquid reagent comprised in the ink composition is separated from the ink particles by being drawn into the substrate, while the ink particles are retained on the surface of the substrate to define nanostructures for the isotropic structural colour printing, wherein the substrate is a porous substrate comprising pores having a pore size which retains essentially all of the ink particles on the surface of the substrate, and wherein the pore size is in the range of 0.1 nm to 2 µm.

2. An apparatus for detecting a target substance in the gaseous phase, the apparatus comprising a nanostructure capable of exhibiting isotropic structural colour formed of a metal-organic framework comprising one or more cavities configured to reversibly entrap one or more molecules of the target substance, and wherein the nanostructure exhibits a change in isotropic structural colour when the one or more molecules of the target substance are entrapped as indication that the target substance is present.

3. The apparatus according to claim 2, wherein the metal-organic framework is selected from the group consisting of ZIF based metal-organic framework, MTh based metal-organic framework, MOF based metal-organic framework, MO based metal-organic framework, HKUST based metal-organic framework, and combinations thereof.

4. The apparatus according to claim 2, further comprising a substrate, wherein the nanostructure is arranged onto the substrate as an amorphous layer of isotropic structures.

5. The apparatus according to claim 4, wherein the substrate is liquid-absorbent or liquid-permeable.

6. The apparatus according to claim 4, wherein the substrate is lipophilic, lipophobic, hydrophilic, hydrophobic, neutral, positively charged and/or negatively charged.

7. The apparatus according to claim 2, wherein the target substance is a vapour comprising nitrogen, water vapour, toluene, ethanol, hexane and/or dimethylformamide.

8. A structural colour printing process comprising:
   a) providing an ink composition comprising ink particles in a liquid reagent; and
   b) depositing the ink composition onto a surface of a substrate, wherein the liquid reagent comprised in the ink composition is separated from the ink particles by being drawn into the substrate via
      (i) a downward infiltration into the substrate, optionally with evaporation from the substrate, or
      (ii) a downward infiltration and a lateral infiltration into the substrate,
      while the ink particles are retained on the surface of the substrate to define nanostructures for the structural colour printing,
   wherein in the case of (i) and evaporation from the substrate being present, volume of liquid reagent being drawn into the substrate with respect to volume of liquid reagent being evaporated from the substrate is varied to control isotropic or anisotropic level of structural colour defined by the nanostructures; and
   wherein in the case of (ii), a contact angle of the ink composition on the substrate and a speed at which the liquid reagent is being drawn into the substrate are varied to control isotropic or anisotropic level of structural colour defined by the nanostructures.

9. The process according to claim 8, wherein the liquid reagent comprises a dispersion medium selected from the group consisting of chloroform, dimethylformamide, ethyl acetate, glycerin, isopropyl alcohol, tetrahydrofuran, water, and combinations thereof.

10. The process according to claim 8, wherein the liquid reagent comprises a thickening agent comprising ethylene glycol, polyurethanes, acrylic polymers, latex, styrene, butadiene, polyvinyl alcohol, cellulose derivatives, and/or gelatin.

11. The process according to claim 8, wherein the substrate is liquid-absorbent or liquid-permeable.

12. The process according to claim 8, wherein the substrate is a porous substrate comprising pores having a pore size which retains essentially all of the ink particles on the surface of the substrate, and wherein the pore size is in the range of 0.1 nm to 2 μm.

13. The process according to claim 12, wherein depositing the ink composition comprises absorbing the liquid reagent into the porous substrate by capillary action.

14. The process according to claim 8, further comprising modifying the surface of the substrate to become lipophilic, lipophobic, hydrophilic, hydrophobic, neutral, positively charged and/or negatively charged prior to depositing the ink composition.

15. The process according to claim 8, wherein the substrate comprises a superabsorbent polymer selected from the group consisting of sodium polyacrylate, polyacrylamide copolymer, cross-linked carboxymethyl cellulose, polyvinyl alcohol copolymer, hydrogels, or oil absorption polymers.

16. The process according to claim 8, wherein the nanostructures are arranged as an amorphous layer of isotropic structures composed of ink particles.

17. The process according to claim 8, wherein the ink particles are selected from the group consisting of carbon-based particles, ceramic particles, fluorescent particles, hybrid polymeric particles containing functional inorganic particles, metallic particles, metal-organic frameworks, metal oxide particles, polymeric particles, silica particles, semiconductor particles, and combinations thereof.

18. The process according to claim 8, wherein each of the ink particles has a shape selected from the group consisting of spheres, cubes, octahedrons, rhombic dodecahedrons, rods, discs, truncated rhombic dodecahedrons, hexagonal prisms, and polyhedral shapes.

19. The process according to claim 8, further comprising coating a layer of a polymer comprising a catechol group to a thickness of 5 nm or more onto each of the ink particles such that each of the ink particles is coated with the polymer comprising the catechol group, before mixing with the liquid reagent.

20. The process according to claim 8, wherein depositing the ink composition comprises depositing the ink particles onto the surface of the substrate by spin coating, spray painting, brush painting, roll-to-roll printing and/or writing with a device containing the ink particles.

* * * * *

UNITED STATES PATENT AND TRADEMARK OFFICE
CERTIFICATE OF CORRECTION

PATENT NO. : 10,933,654 B2
APPLICATION NO. : 16/472657
DATED : March 2, 2021
INVENTOR(S) : Hongwei Duan et al.

It is certified that error appears in the above-identified patent and that said Letters Patent is hereby corrected as shown below:

In the Claims

Column 29, Claim 3, Line 5:
"MTh" should read: --MIL--.

Column 29, Claim 3, Line 7:
"MO" should read: --UIO--.

Signed and Sealed this
Seventh Day of June, 2022

Katherine Kelly Vidal
*Director of the United States Patent and Trademark Office*